US010268853B2

(12) United States Patent
Nagata et al.

(10) Patent No.: US 10,268,853 B2
(45) Date of Patent: Apr. 23, 2019

(54) OPTICAL INFORMATION READING DEVICE

(71) Applicant: Keyence Corporation, Osaka (JP)

(72) Inventors: Hidezumi Nagata, Osaka (JP); Taichi Tajika, Osaka (JP); Hiroomi Ohori, Osaka (JP); Taiga Nomi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/849,737

(22) Filed: Dec. 21, 2017

(65) Prior Publication Data

US 2018/0239937 A1 Aug. 23, 2018

(30) Foreign Application Priority Data

Feb. 23, 2017 (JP) .................... 2017-032313

(51) Int. Cl.
*G06K 9/80* (2006.01)
*G06K 7/10* (2006.01)
*G06K 7/14* (2006.01)

(52) U.S. Cl.
CPC ....... *G06K 7/10722* (2013.01); *G06K 7/1408* (2013.01); *G06K 7/1413* (2013.01); *G06K 7/1417* (2013.01)

(58) Field of Classification Search
CPC .......... G06K 13/00; G06K 13/02; G06C 7/10
USPC ............ 235/462.11, 462.14, 462.15, 462.23
See application file for complete search history.

(56) References Cited

U.S. PATENT DOCUMENTS

| 9,430,690 | B2 | 8/2016 | Nagata et al. | |
|---|---|---|---|---|
| 9,542,583 | B2 | 1/2017 | Nagata et al. | |
| 2006/0073883 | A1* | 4/2006 | Franks, Jr. | G06Q 30/02 463/25 |
| 2006/0195567 | A1* | 8/2006 | Mody | G07F 17/32 709/224 |

FOREIGN PATENT DOCUMENTS

| JP | H9-006891 | 1/1997 |
|---|---|---|
| JP | 2016-033787 | 3/2016 |

OTHER PUBLICATIONS

U.S. Appl. No. 15/849,742, filed Dec. 21, 2017 (92 pages).

* cited by examiner

*Primary Examiner* — Daniel St Cyr
(74) *Attorney, Agent, or Firm* — Kilyk & Bowersox, P.L.L.C.

(57) ABSTRACT

[Object] To enhance a reading accuracy of a code even when a light amount, which can be received by an imaging element, varies greatly. [Means to solve the problems] A plurality of second images in response to a plurality of different conversion characteristics is generated by using the first image obtained at the time of setting of an optical information reading device. The results, in which codes included in the generated second images are respectively decoded by a decoding part, are analyzed, and one of the conversion characteristics is selected. The second image in response to the selected conversion characteristic is generated by using the first image at the time of operation of the optical information reading device.

9 Claims, 20 Drawing Sheets

FIG. 14

| | | READING | BANK | RS-232C | Ethernet | OPERATION MODE | INPUT/OUTPUT TERMINAL | IMAGE/STORAGE | OTHER | SETTING ITEM |

| | NAME AND MODEL OF DEVICE (IP ADDRESS) |
|---|---|
| ○ ☐ | READER SR-2000 (192.168.100.100) Operating (Ethernet) |

| | SETTING ITEM | BANK 1 ▼ | BANK 2 | BANK 3 | BANK 4 | BANK 5 |
|---|---|---|---|---|---|---|
| COMMON | ALTERNATE | VALID | VALID | INVALID | INVALID | INVALID |
| | NUMBER OF TIMES OF RETRY IN BANK | 0 | 0 | 0 | 0 | 0 |
| | TIMEOUT VALUE OF DECODING (x10ms) | 7 | 5 | 7 | 5 | 7 |
| | AREA NUMBER | 0 | 0 | 0 | 0 | 0 |
| | BLACK AND WHITE INVERSION | NOT APPLY | NOT APPLY | NOT APPLY | NOT APPLY | NOT APPLY |
| | HORIZONTAL INVERSION | NOT APPLY | NOT APPLY | NOT APPLY | NOT APPLY | NOT APPLY |
| | CODE DIRECTION (ID) | NO LIMITATION | NO LIMITATION | NO LIMITATION | NO LIMITATION | NO LIMITATION |
| | REFERENCE TILT ANGLE | 180 | 180 | 180 | 180 | 180 |
| | TILT ANGLE RANGE | | | | | |
| CODE | CODE DETAILS SETTING | DataMatrix | DataMatrix | DataMatrix | QR | DataMatrix |
| | COLUMN LIMIT OUTPUT FUNCTION | INVALID | INVALID | INVALID | INVALID | INVALID |
| | DIRECTION OF COLUMN LIMIT OUTPUT | FROM FRONT | FROM FRONT | FROM FRONT | FROM FRONT | FROM FRONT |
| | VALID DIGIT OF COLUMN LIMIT OUTPUT | 7089 | 7089 | 7089 | 7089 | 7089 |
| | START DIGIT OF COLUMN LIMIT OUTPUT | | | | | |
| ILLUMINATION | USE OF INTERNAL ILLUMINATION | APPLY | APPLY | APPLY | APPLY | APPLY |
| | USE OF EXTERNAL ILLUMINATION | NOT APPLY | NOT APPLY | NOT APPLY | NOT APPLY | NOT APPLY |
| | POLARIZING FILTER | VALID | VALID | VALID | VALID | VALID |
| IMAGING | EXPOSURE TIME (μs) | 222 | 246 | 163 | 246 | 163 |
| | GAIN | 22 | 40 | 20 | 39 | 20 |
| | CONTRAST ADJUSTMENT METHOD | HDR | CONTRAST EMPHASIS | STANDARD | SUPER HDR | HDR |
| | DETAILS | CUSTOM | CUSTOM | CUSTOM | CUSTOM | CUSTOM |
| IMAGE PROCESSING FILTER | FIRST IMAGE PROCESSING FILTER | INVALID | INVALID | INVALID | INVALID | INVALID |
| | NUMBER OF TIMES OF FIRST IMAGE PROCESSING FILTER | 1 | 1 | 1 | 1 | 1 |
| | SECOND IMAGE PROCESSING FILTER | INVALID | INVALID | INVALID | INVALID | INVALID |
| | NUMBER OF TIMES OF SECOND IMAGE PROCESSING FILTER | 1 | 1 | 1 | 1 | 1 |
| | THIRD IMAGE PROCESSING FILTER | INVALID | INVALID | INVALID | INVALID | INVALID |
| | NUMBER OF TIMES OF THIRD IMAGE PROCESSING FILTER | 1 | 1 | 1 | 1 | 1 |
| | FOURTH IMAGE PROCESSING FILTER | INVALID | INVALID | INVALID | INVALID | INVALID |
| | NUMBER OF TIMES OF FOURTH IMAGE PROCESSING FILTER | 1 | 1 | 1 | 1 | 1 |

OPTICAL INFORMATION READING DEVICE

CROSS-REFERENCE TO RELATED APPLICATIONS

The present application claims foreign priority based on Japanese Patent Application No. 2017-032313, filed Feb. 23, 2017, the contents of which is incorporated herein by reference.

TECHNOLOGICAL FILED

The present invention relates to an optical information reading device which optically reads information.

BACKGROUND TECHNOLOGY

In recent years, code readers capable of tracing articles in distribution channels from a manufacturing stage to a consumption stage or a disposal stage, so called traceability, have been considered important, and such code readers for the purpose of the traceability have become popular. Further, other than the traceability, the code readers have been used in various fields.

In general, the code readers have a configuration to read images of bar codes or two-dimensional codes, etc., which are attached to workpieces, and the codes on the obtained images are read and binarized by image processing, and they are decoded so as to read information. The code readers are the devices which optically read information, so that it is also called as optical information reading devices.

In such type of the optical information reading device, a reading depth of a camera, that is, a focusing range of a camera lens, is one of the important features. That is, at the site where plural types of workpieces in different sizes mixedly exist, there is a case in which a distance between codes and the camera changes depending on the size. Further, even though the plural types of workpieces do not mixedly exist, when the type of the workpieces changes on a production line, there is a case in which a distance between codes and the camera changes. In such cases, in order to read the codes without changing a camera position, it is preferred that the reading depth of the camera is deep.

In order to set the reading depth of the camera to be deep, the diaphragm of the lens can be reduced. However, when the diaphragm of the lens is reduced, the light amount (brightness) which is received by the imaging element lacks. Further, when the distance between the code and the camera increases, the light amount lacks as well. When the light amount lacks, the contrast of the obtained images becomes low, and therefore, the reading accuracy deteriorates.

For example, as described in Japanese Patent Application Publication No. 2016-33787, in order to compensate the deficiency in light amount, a tuning process, which automatically sets an exposure time or a gain of the camera to be an optimum value, was performed at the time before the actual operation, that is, at the time of setting.

DISCLOSURE OF THE INVENTION

Problems to be Solved by the Invention

However, for example, in a case in which the exposure time is too long at the time of tuning, when workpieces move such as workpieces during conveying, a blur occurs on the obtained images. Further, in a case in which the gain is too large at the time of tuning, a large amount of noise occurs on the obtained images, and therefore, on the contrary, there is a risk that the reading accuracy deteriorates. Furthermore, there are cases in which the codes attached to the workpieces may be low contrast in the first place, and in this case, it makes difficult to enhance the accuracy of reading no matter how much the exposure time or the gain is adjusted by tuning.

The present invention has been made in consideration of the aforementioned circumstances. An object of the present invention is to enhance accuracy of reading codes even when light amount receiving to an imaging element greatly changes.

Means for Solving the Problems

In order to achieve the aforementioned object, in the present invention, an optical information reading device includes an imaging part provided with an imaging element which takes an image of a code attached to a workpiece; a conversion part generating a second image by converting from a pixel value of a first image obtained by the imaging part to a pixel value in response to a predetermined conversion characteristic; and a decoding part decoding a code included in the second image generated by the conversion part. The optical information reading device further includes a conversion characteristic storage part storing a plurality of different conversion characteristics used as a predetermined conversion characteristic at a time of conversion of the pixel value in the conversion part; and a processing part controlling the conversion part to generate the second image in response to the conversion characteristic stored in the conversion characteristic storage part by using the first image obtained by the imaging part at a time of setting of the optical information reading device before operation of the optical information reading device, and to select one of the plurality of different conversion characteristics by analyzing a result in which the code included in the generated second image is decoded by the decoding part. The conversion part generates the second image in response to the conversion characteristic selected by the processing part by using the first image obtained by the imaging part at a time of the operation of the optical information reading device.

With such structure, at the time of setting of the optical information reading device, the plurality of second images in response to each of the plurality of different conversion characteristics, which is preliminary stored in the conversion characteristic storage part, can be generated by using the first images obtained by the imaging part. By analyzing the results in which codes included in the plurality of generated second images are decoded, a conversion characteristic suitable for the operation time of the optical information reading device can be selected. At the time of operation, the second images in response to the above selected conversion characteristic are generated by using the first images obtained by the imaging part, and the codes included in the second images can be decoded.

That is, by automatically selecting the conversion characteristic which suppresses the variation in a case in which the brightness variation is greater, the reading accuracy of the codes at the time of operation of the optical information reading device can be enhanced. Further, in a case in which the codes attached to the workpieces are low contrast, by automatically selecting the conversion characteristic which enhances the contrast, the reading accuracy of the codes at the time of operation of the optical information reading device can be enhanced.

The processing part may be configured to control the imaging part to obtain a plurality of first images at the time of setting of the optical information reading device, and controls the conversion part to generate a plurality of second images in response to each of the conversion characteristics, which are stored in the conversion characteristic storage part, for each of the plurality of first images.

Further, the optical information reading device may include an illumination part illuminating the code attached to the workpiece. The processing part may be configured to control the imaging part to obtain the plurality of first images by taking images multiple times while changing an imaging condition or an illumination condition at the time of setting of the optical information reading device.

The processing part may be configured to control the imaging part to obtain one first image and to control the conversion part to generate a plurality of second images in response to each of the conversion characteristics, which are stored in the conversion characteristic storage part, by using the one first image at the time of setting of the optical information reading device.

The conversion characteristic storage part includes at least a first conversion characteristic, which is formed of a substantially logarithmic curve for suppressing a brightness variation of the first images obtained by the imaging part at the time of operation of the optical information reading device, and a second conversion characteristic, which is formed on a substantially exponential curve for enhancing a contrast of the first images obtained by the imaging part at the time of operation of the optical information reading device. The processing part may be configured to control the conversion part to generate a second image in response to the first conversion characteristic and a second image in response to the second conversion characteristic, and by analyzing results in which codes included in the second images are decoded by the decoding part, one of the first conversion characteristic and the second conversion characteristic is selected.

The processing part may be configured to control the decoding part to decode each of the codes included in the plurality of second images, and to analyze a reading margin indicating easiness of reading the codes which are successfully decoded.

Further, the optical information reading device may include a parameter setting storage part storing a parameter setting including a plurality of parameters which constitutes at least one of the imaging condition of the imaging part and the image processing condition in the decoding part. The parameter setting may include a parameter which constitutes a conversion characteristic selected by the processing part.

The processing part may be configured to select a plurality of conversion characteristics based on the results in which a code included in each of the plurality of second images is decoded by the decoding part, and a parameter setting including a parameter, which constitutes each of the plurality of selected conversion characteristics, is stored in the parameter setting storage part.

A plurality of different parameter settings is stored in the aforementioned parameter setting storage part. Further, the optical information reading device may include a parameter setting switching part switching from one parameter setting to another parameter setting.

Effects of the Invention

According to the present invention, a conversion characteristic suitable for circumstances can be automatically selected, so that a reading accuracy of codes at the time of operation of the optical information reading device can be enhanced.

BRIEF DESCRIPTION OF THE DRAWINGS

FIG. 14 is a user interface in order to display storage contents of a parameter setting storage part.

PREFERRED EMBODIMENTS OF THE INVENTION

Hereinafter, the embodiments of the present invention will be described with reference to the drawings. The following description of the preferred embodiments is merely for illustrative purposes and is not intended to limit the scope of the present invention, and the application or use thereof.

Figure 1:
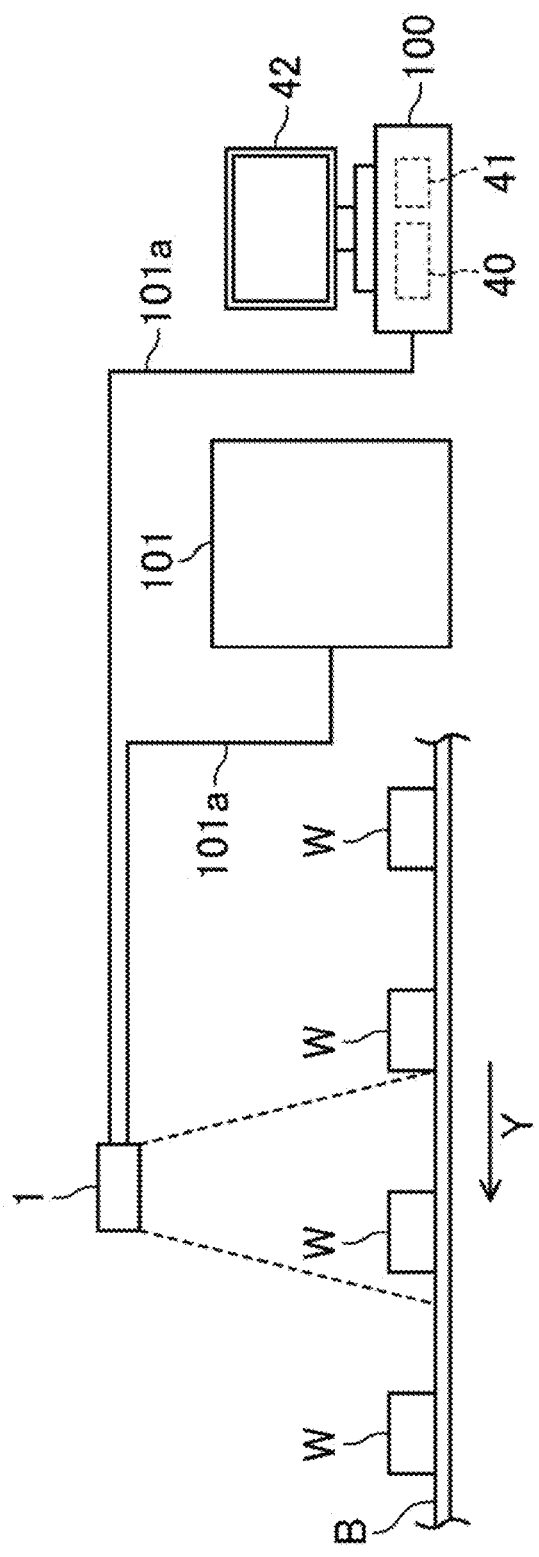
FIG. 1 is an explanatory diagram at the time of operation of an optical information reading device.

FIG. 1 is a schematic diagram at the time of operation of an optical information reading device 1 according to the embodiment of the present invention. In this example, a plurality of workpieces W in a state being placed on an upper surface of a belt conveyer for conveyance B is conveyed in an arrow Y direction as shown in FIG. 1, and the optical information reading device 1 according to the embodiment is mounted in a place separated upwardly from the workpieces W. The optical information reading device 1 is the code reader which is configured to take images of codes attached to the workpieces W, and a decoding processing is performed to the codes included in the obtained images so as to read the information. The optical information reading device 1 may be fixed to a bracket, etc. (not shown) so as not to move at the time of operation, or it may be held by a robot (not shown) or a user, etc. so as to move at the time of operation. Further, the codes of the workpieces W in a stationary state may be read by the optical information reading device 1. The phrase "at the time of operation" means the operation when the codes attached to the workpieces W conveyed by the belt conveyer for conveyance B are sequentially read.

Further, a code is attached to an upper surface of each workpiece W. The code includes both of a bar code and a two-dimensional code. As the two-dimensional codes, for example, there are a QR Code (registered trademark), a Micro QR Code, a DataMatrix; a Data Code, a Veri Code, an Aztec Code, a PDF417, a Maxi Code, etc. In the two-dimensional codes, there are a stack-type and a matrix-type, and the present invention can be applied to any of these two-dimensional codes. The codes may be attached to the workpieces W by direct printing or imprinting, or the codes may be attached to the workpieces W after printing on a label, so that any means or methods can be used.

The optical information reading device 1 is wire-connected to a computer 100 and a programmable logic controller (PLC) 101 by signal lines 100a, 101a, respectively. However, it is not limited. A communication module may be incorporated with the optical information reading device 1, the computer 100, and the PLC 101, and the optical information reading device 1 may be wirelessly connected with the computer 100 and the PLC 101. The PLC 101 is the control device which performs a sequence control to the belt conveyer for conveyance B and the optical information reading device 1, and a generic PLC may be used. The computer 100 may be a generic, an exclusive electronic computer, an exclusive portable terminal, etc.

Further, at the time of operation, the optical information reading device 1 receives reading start trigger signals, which specify a start timing of the code reading, from the PLC 101 through the signal line 101a. The optical information reading device 1 performs taking images and decoding codes based on the reading start trigger signals. After that, the decoding results are transmitted to the PLC 101 through the signal line 101a. In this way, at the time of operation of the optical information reading device 1, the inputs of the reading start trigger signals and the outputs of the decoding results are repeatedly performed between the optical information reading device 1 and the external control device such as the PLC 101, etc. through the signal line 101a. The inputs of the reading start trigger signals and the outputs of the decoding results may be performed between the optical information reading device 1 and the PLC 101 through the signal line 101a as described above, or any other signal lines, which are not shown, may be used. For example, a sensor for detecting the arrival of workpieces W and the optical information reading device 1 are directly connected, and the reading start trigger signals may be inputted to the optical information reading device 1 from the sensor.

[Overall Structure of Optical Information Reading Device 1]

As shown in FIGS. 2 to 6, the optical information reading device 1 is provided with a device body 2 and a polarizing filter attachment 3. The polarizing filter attachment 3 may be omitted. The device body 2 is provided with an illumination part 4, an imaging part 5, a display part 6, a power connector 7, and a signal line connector 8. Further, the device body 2 is provided with an indicator 9 shown in FIG. 5, an aimer 10 shown in FIG. 3, a select button 11 shown in FIG. 5, and an enter button 12.

In the explanation of this embodiment, the front face, the rear face, the upper face, the lower face, the left face, and the right face of the optical information reading device 1 are defined, but this is just for the convenience of the explanation, so that it is not limited to the direction of the optical information reading device 1 when it is used. That is, as shown in FIG. 1, the optical information reading device 1 may be usable in the following postures: the front face of the optical information reading device 1 may be set downwardly when it is used; the front face of the optical information reading device 1 may be set upwardly when it is used; or the front face of the optical information reading device 1 may be set inclinedly when it is used. Further, the left and right directions of the optical information reading device 1 can be called as a width direction.

Figure 2:
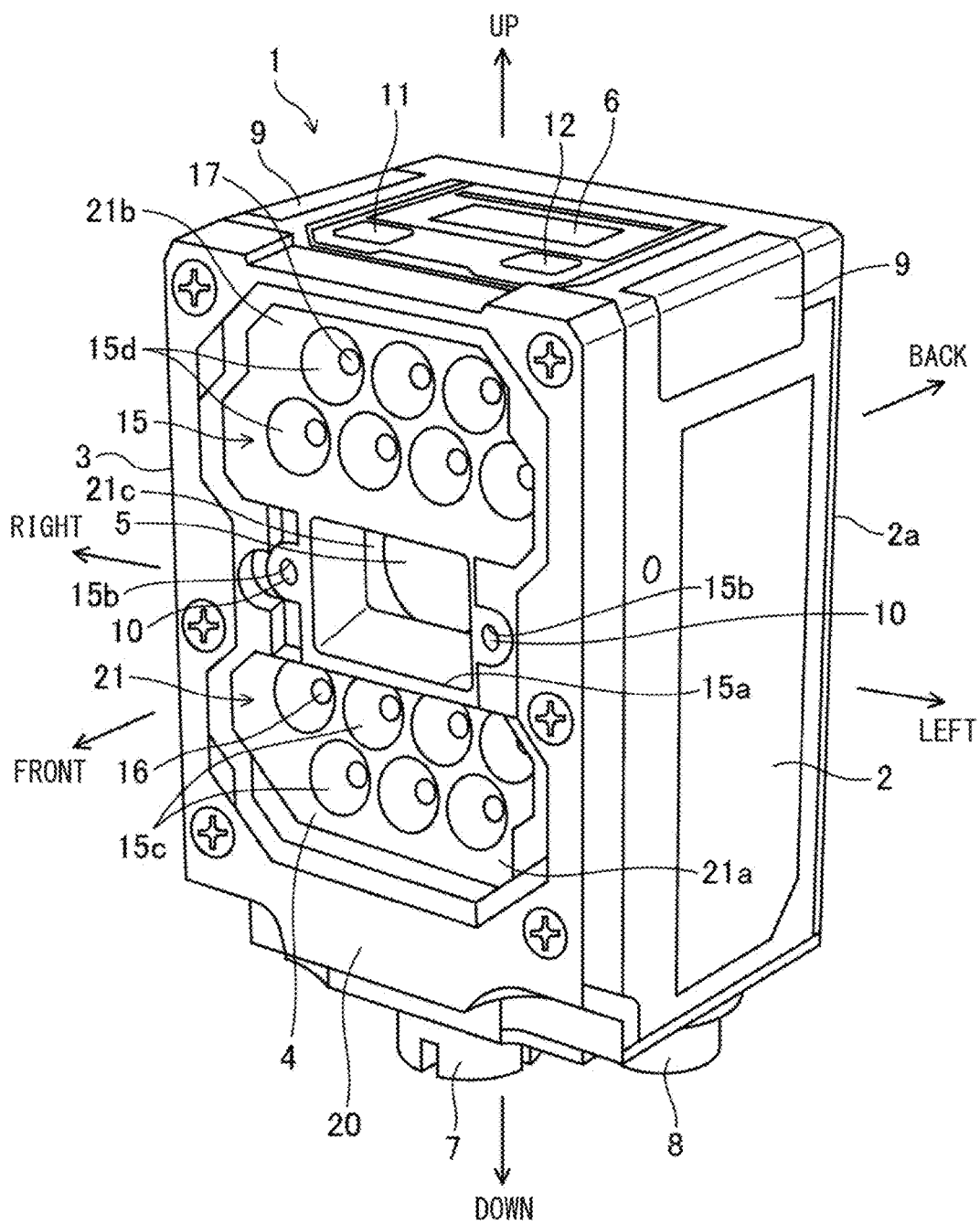
FIG. 2 is a perspective view showing the optical information reading device.
Figure 6:
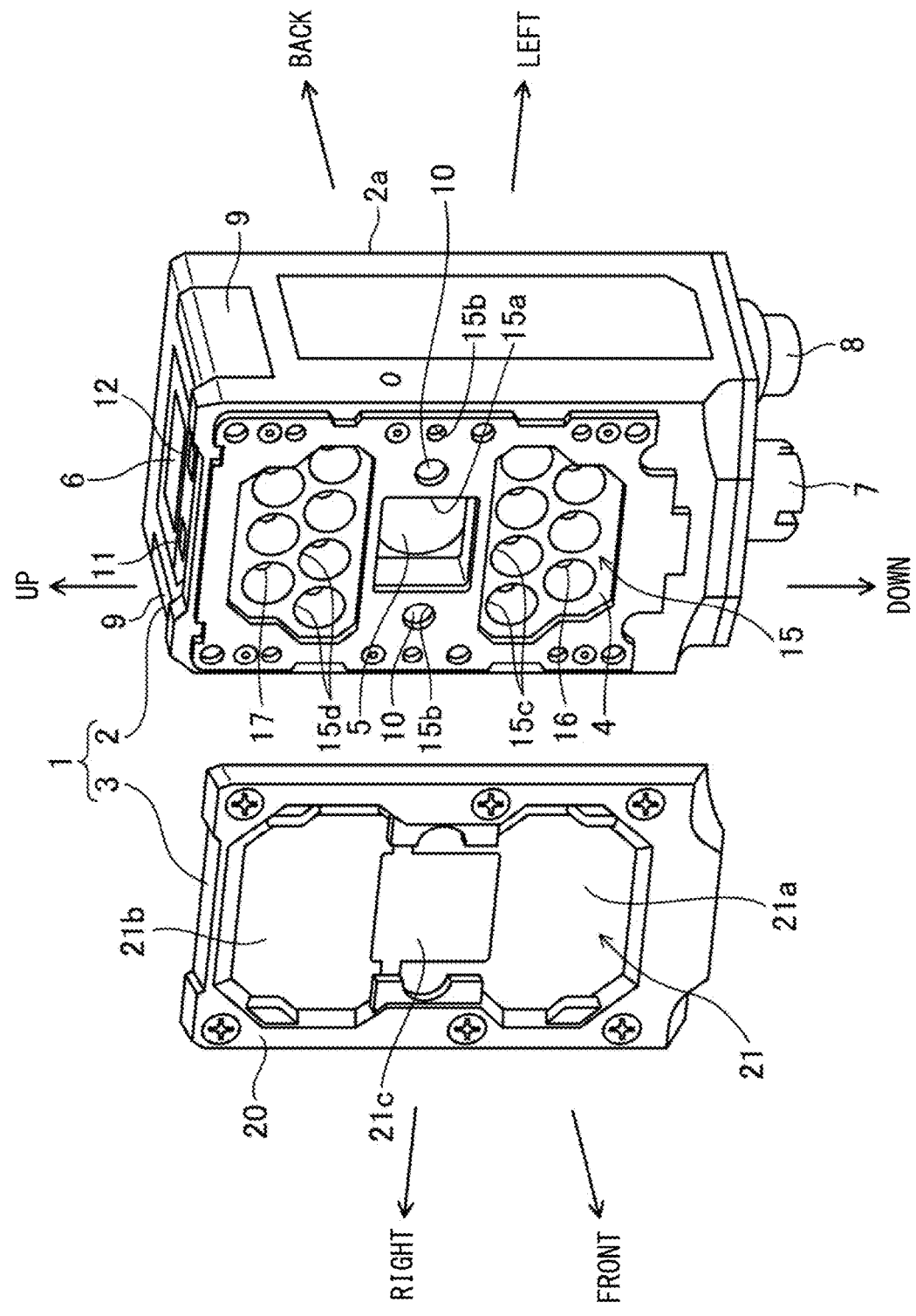
FIG. 6 is a perspective view showing a state in which a polarizing filter attachment is removed from a main body.
Figure 11:
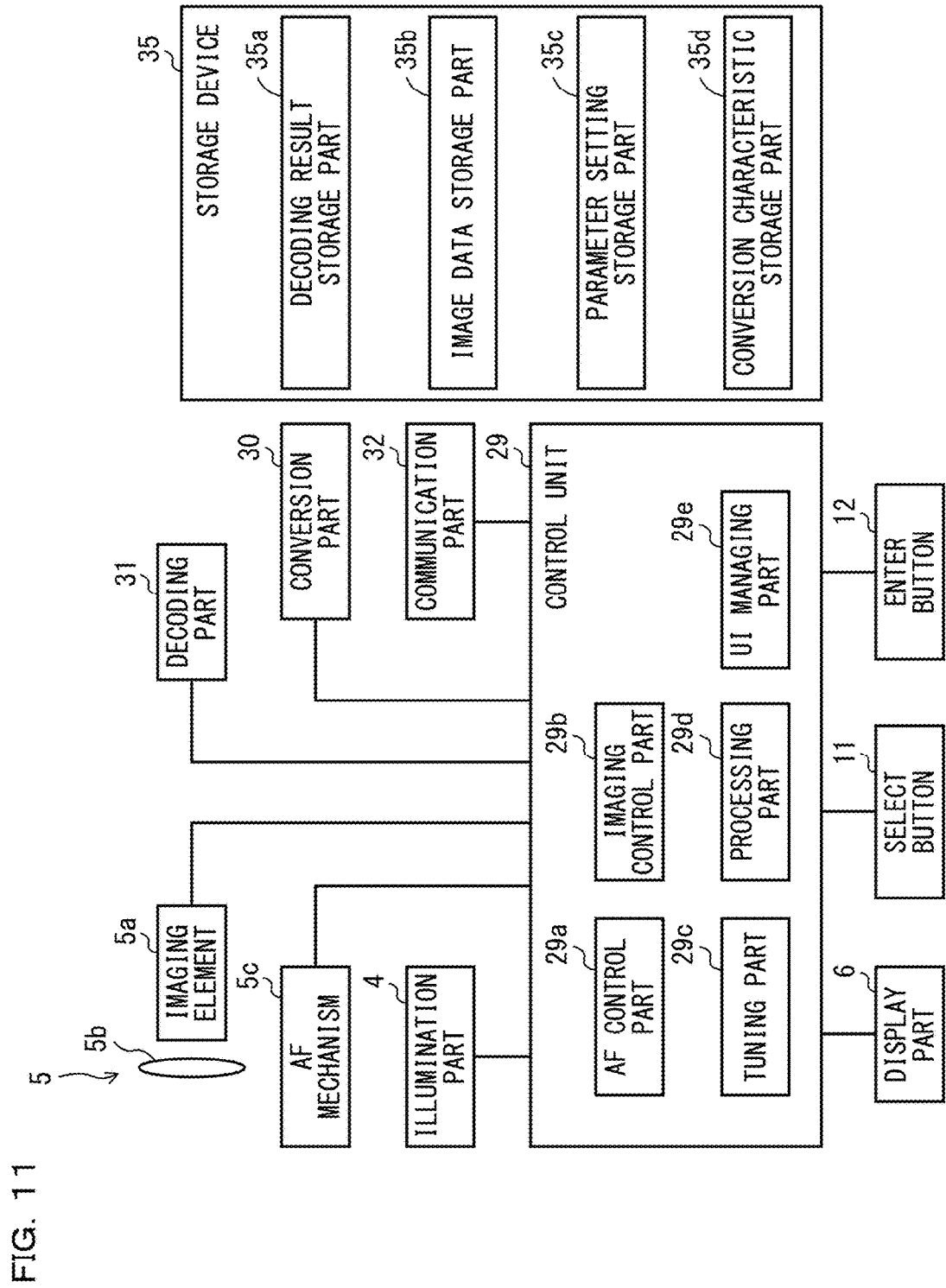
FIG. 11 is a block diagram showing the optical information reading device.

The device body 2 is provided with an approximately rectangular box-shaped casing 2a which is vertically long. A control unit 29 and a decoding part 31, etc. shown in FIG. 11 are provided inside the casing 2a. As shown in FIGS. 2 and 6, the polarizing filter attachment 3 is detachably mounted to the front face of the casing 2a. Further, on the front face of the casing 2a, an illumination part 4, which illuminates at least codes on the workpieces W by irradiating light in the front direction of the optical information reading device 1, and an imaging part 5, which takes images of at least a code on the workpieces W located in the front direction of the optical information reading device 1, are provided. In addition, on the front face of the casing 2a, the aimer 10 which is configured by a light emitting body such as a light emitting diode (LED), etc. is provided. The aimer 10 is used as a guide to determine an imaging range of the imaging part 5 or an optical axis of the illumination part 4 by irradiating light in the front direction of the optical information reading device 1. The optical information reading device 1 may be set by the user with reference to the light irradiated from the aimer 10.

A display part 6 is provided on the upper face of the casing 2a. Further, on the upper face of the casing 2a, the select button 11 and the enter button 12 used at the time of setting, etc. of the optical information reading device 1 are provided. The selected button 11 and the enter button 12 are connected to the control unit 29, and the control unit 29 is capable of detecting the operation status of the select button 11 and the enter button 12. The select button 11 is the button for selecting an option among the plurality of options displayed in the display part 6. The enter button 12 is the button for confirming the option selected by the select button 11.

Further, an indicator 9 is provided respectively in both left and right sides of the upper face of the casing 2a. The indicator 9 is connected to the control unit 29, and it may be configured with a light emitting body such as a light emitting diode, etc. The operation status of the optical information reading device 1 can be notified externally by the lighting state of the indicator 9.

On the lower face of the casing 2a, a power connector 7, in which a power wiring for supplying electric power to the optical information reading device 1 is connected, and an ethernet connector 8 for signal lines 100a, 101a connected to the computer 100 and the PLC 101 are provided. The ethernet standard is one example, but a signal line with a standard other than the ethernet standard may be used.

[Structure of Illumination Part 4]

Figure 3:
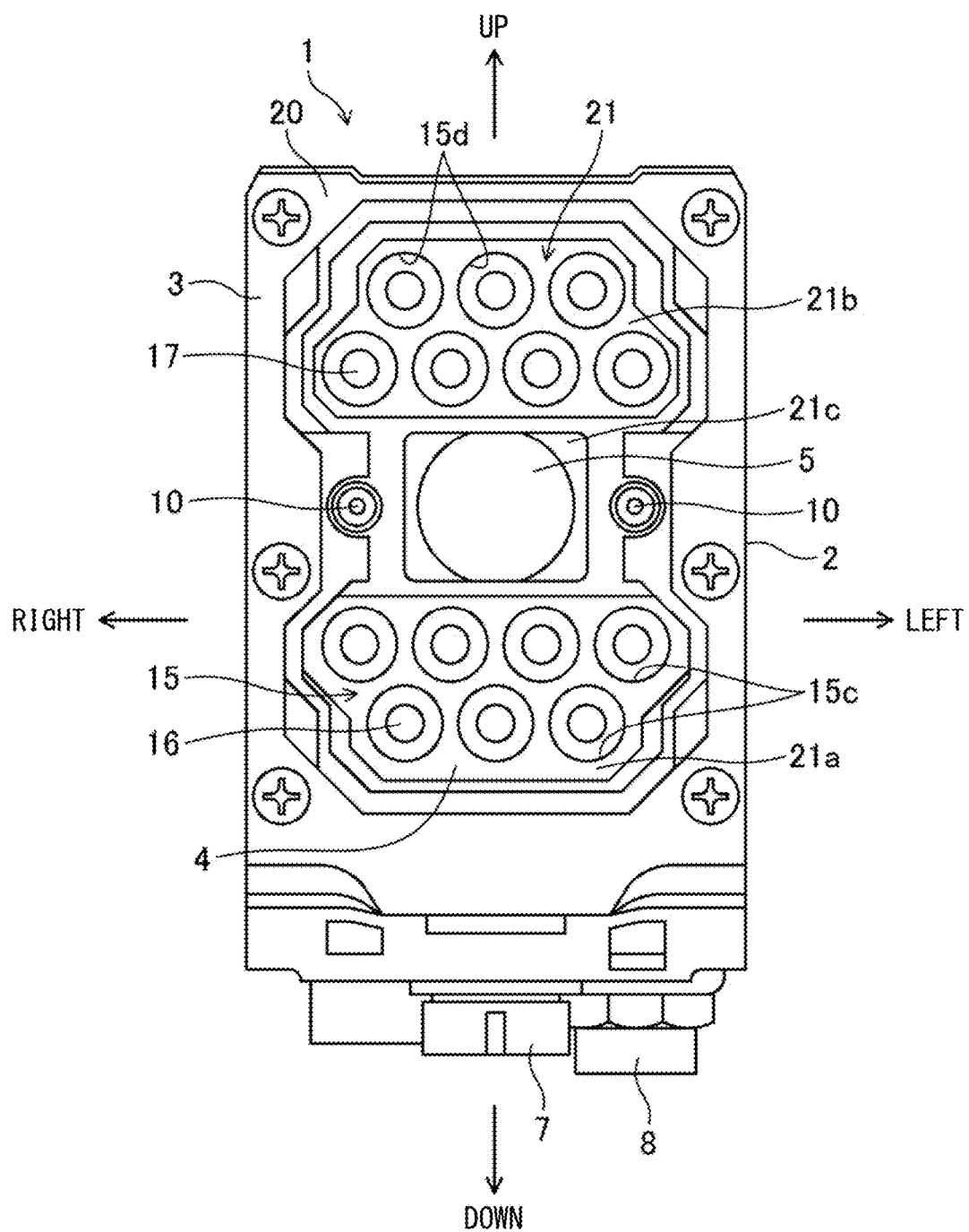
FIG. 3 is a diagram showing the optical information reading device viewed from an illumination part side.
Figure 4:
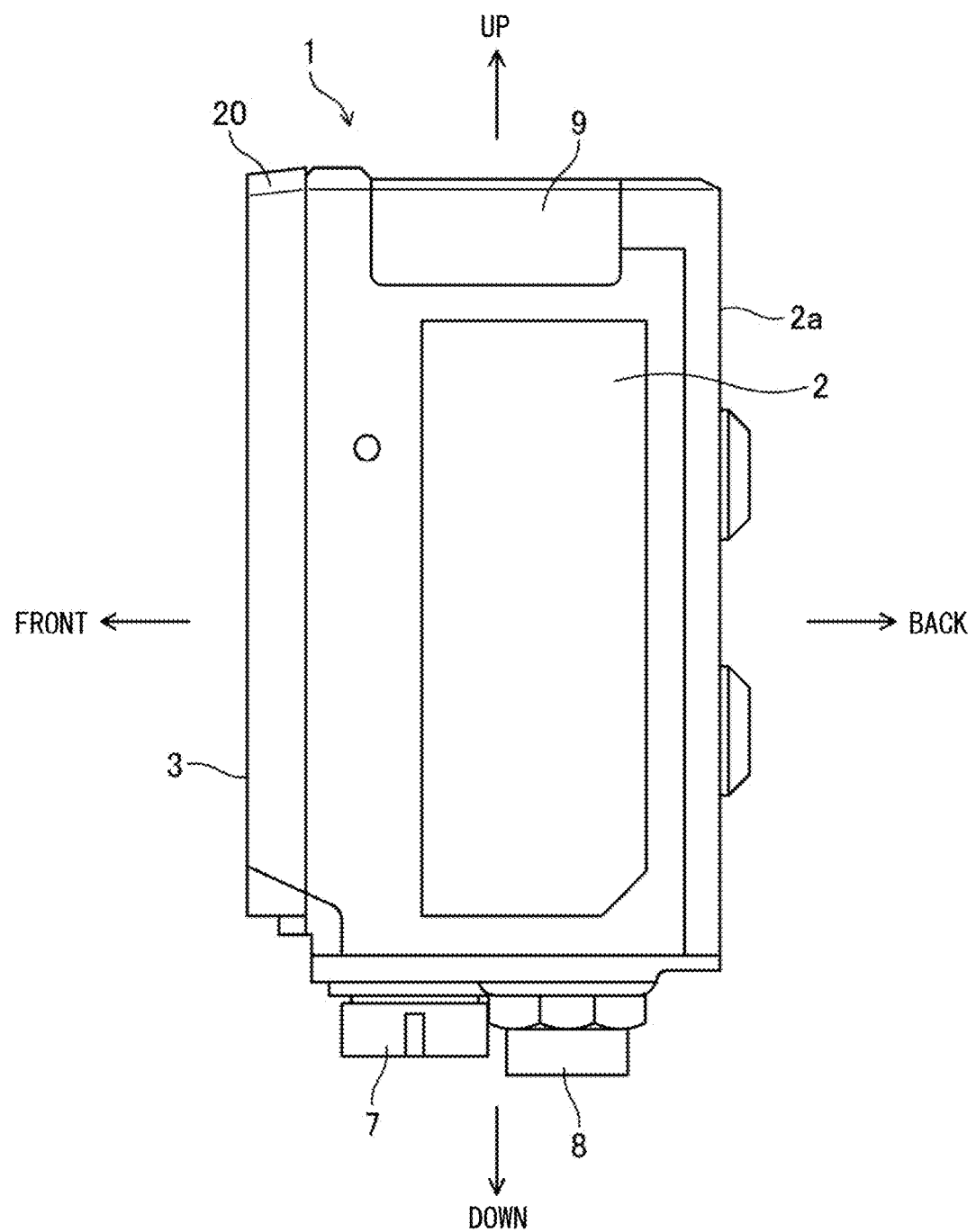
FIG. 4 is a side surface view showing the optical information reading device.
Figure 5:
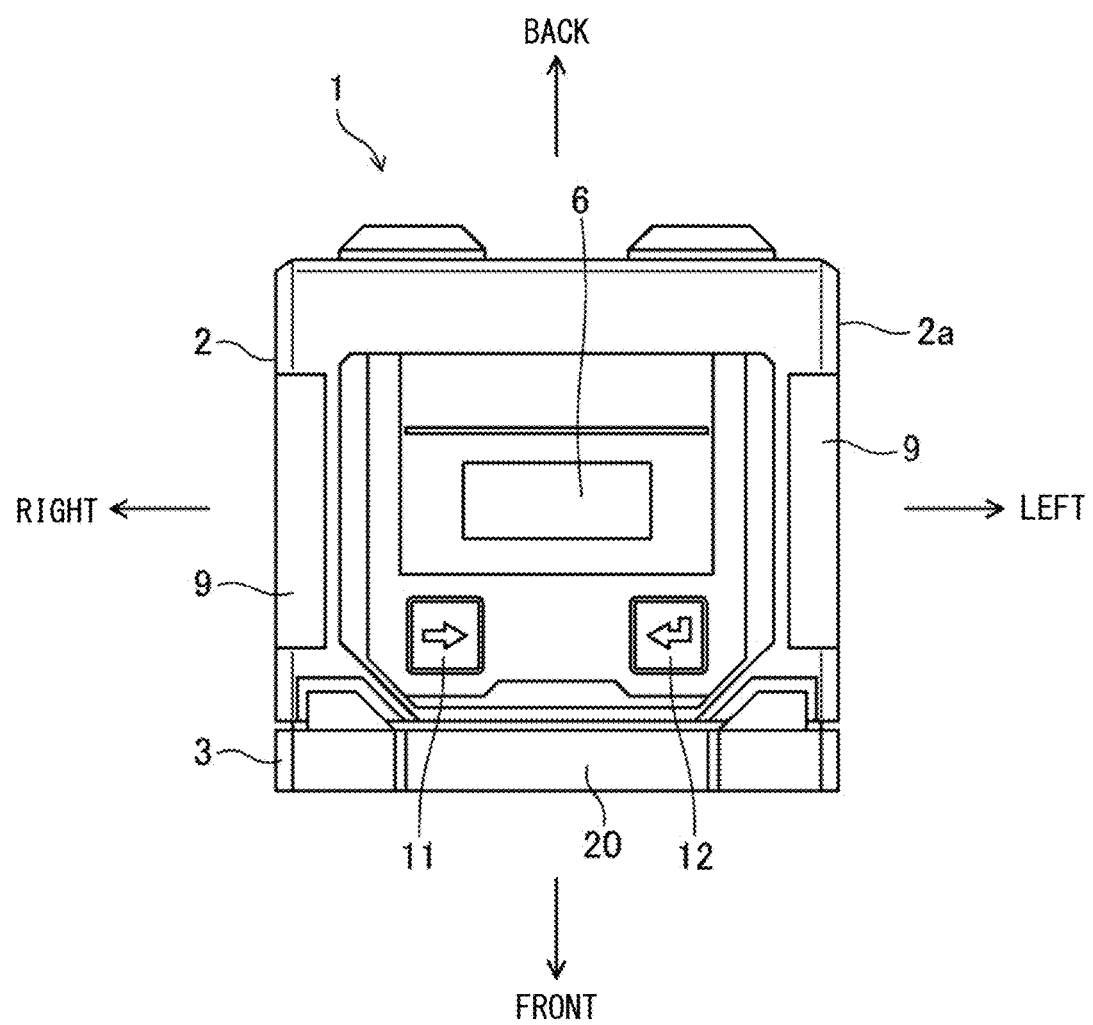
FIG. 5 is a diagram showing the optical information reading device viewed from a display part side.
Figure 7:
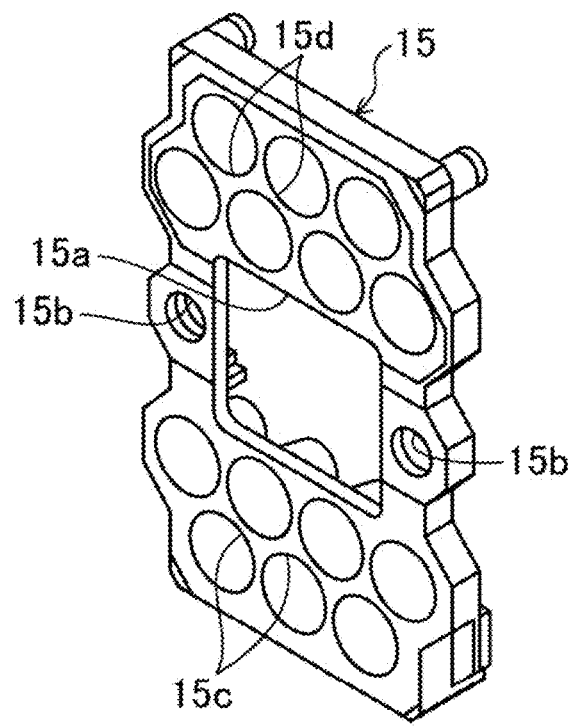
FIG. 7 is a perspective view showing a reflector.
Figure 8:
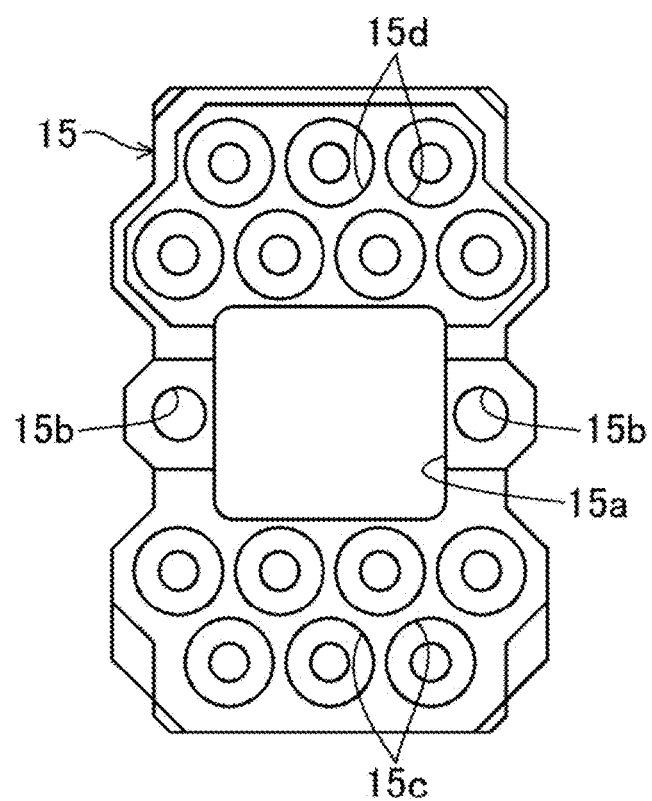
FIG. 8 is a front view showing the reflector.

The illumination part 4 is provided with a reflector 15 as shown in FIGS. 7 and 8, a plurality of first light emitting diodes 16, and a plurality of second light emitting diodes 17 as shown in FIG. 3, etc. The first light emitting diodes 16 and the second light emitting diodes 17 are electrically connected to the control unit 29 and are individually controlled by the control unit 29, so that these lights can be separately turned on and off.

As shown in FIGS. 7 and 8, the reflector 15 has a plate shape which extends from the upper part to the lower part of the front face of the optical information reading device 1. Seven of the first light emitting diodes 16 and seven of the second light emitting diodes 17 are provided, but the numbers of the first light emitting diodes 16 and the second light emitting diodes 17 are not limited to this example. The first light emitting diodes 16 and the second light emitting diodes 17 are arranged in the back side of the reflector 15, and the optical axis is provided to irradiate light forward. At the middle part in the upper and lower direction of the reflector 15, an opening part for imaging 15a is formed to allow the imaging part 5 to face outside. In the both left and right sides of the opening part for imaging 15a in the reflector 15, an opening part for aimer 15b in order to pass through the light of the aimer 10 is provided.

In the lower section of the reflector 15 which is lower than the opening part for imaging 15a, first holes 15c whose numbers are equal to the number of the first light emitting diodes 16, that is seven, are formed to pass through the light of the first light emitting diodes 16 and the light is condensed and irradiated forward. The shape of these first holes 15c is the same shape which is a cone-shape so as to gradually diametrically expand forward. A plating such as a gold plating, etc. is applied to the inner surface of the first holes 15c in order to enhance the reflectivity of the light.

Four of the first holes 15c among seven of the first holes 15c are arranged in a line in the left and right direction (width direction) of the optical information reading device 1. The remaining three of the first holes 15c are arranged, so that the center of the remaining three first holes 15c are lower than the center of the aforementioned four first holes 15c, and the remaining three first holes 15c are positioned between the centers of the adjacent first holes 15c, 15c among the aforementioned four first holes, respectively. In this way, seven of the first holes 15c can be arranged densely. The first light emitting diodes 16 are arranged in the centers of the first holes 15c, respectively.

In the upper section of the reflector 15 which is upper than the opening part for imaging 15a, the second holes 15d whose numbers are equal to the number of the second light emitting diodes 17, that is seven, are formed to pass through the light of the second light emitting diodes 17 and the light is condensed and irradiated forward. The shape of these second holes 15d is the same shape as formed in the first holes 15c, and a plating which is the same plating as applied to the first holes 15c is applied to the inner surface of the second holes 15d.

Four of the second holes 15d among seven of the second holes 15d are arranged in a line in the left and right direction (width direction) of the optical information reading device 1. The remaining three of the second holes 15d are arranged so that the center of the remaining three second holes 15d are upper than the center of the aforementioned four second holes 15d, and the remaining three second holes 15d are positioned between the centers of the adjacent second holes 15d, 15d among the aforementioned four second holes, respectively. In this way, seven of the second holes 15c can be arranged densely. The second light emitting diodes 17 are arranged in the centers of the second holes 15d, respectively.

The illumination part 4 may be formed separately from the imaging part 5. In this case, the illumination part 4 and the imaging part 5 may be connected by a wired line or a wireless line. Further, the control unit 29 as described later may be incorporated in the illumination part 4, or may be incorporated in the imaging part 5.

[Structure of Polarizing Filter Attachment 3]

Figure 9:
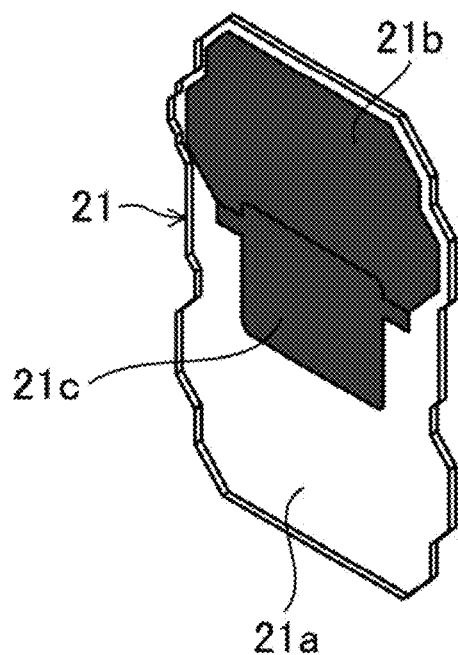
FIG. 9 is a perspective view showing a translucent panel.
Figure 10:
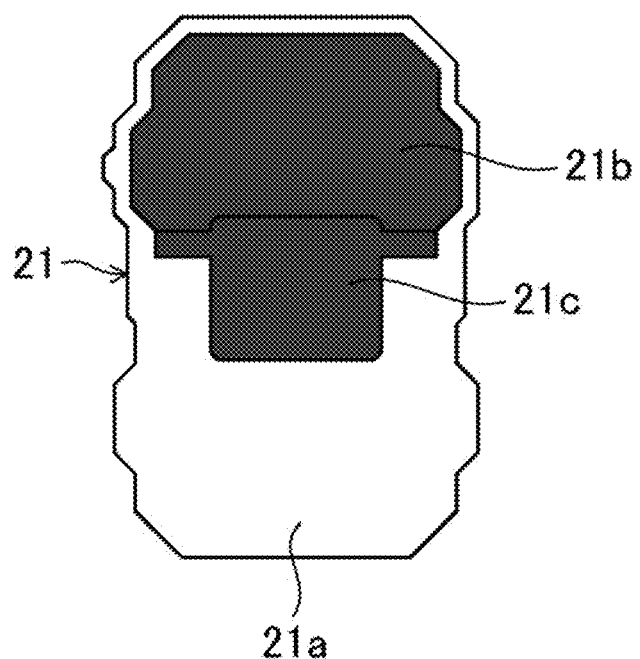
FIG. 10 is a front view showing the translucent panel.

As shown in FIG. 6, the polarizing filter attachment 3 is provided with a frame member 20 and a translucent panel 21. The frame member 20 has an outer shape which substantially matches with the outer shape of the front face of the optical information reading device 1. The translucent panel 21 is provided in the inner part of the frame member 20. The translucent panel 21 is formed to cover the first light emitting diodes 16 and the second light emitting diodes 17 from the front side and is also formed to cover the imaging part 5 from the front side. As shown in FIGS. 9 and 10, a part where the translucent panel 21 covers the first light emitting diodes 16, that is the lower section 21a where the light of the first light emitting diodes 16 is irradiated, is the part which is colorless and transparent and does not have the polarizing filter. On the other hand, a part which covers the second light emitting diodes 17 in the translucent panel 21, that is, the upper section 21b is the part where the light of the second light emitting diodes 17 is emitted, and the upper section 21b is the part where the polarizing filter is provided. Further, the middle section 21c between the lower section 21a and the upper section 21b in the translucent panel 21 is the part to cover the imaging part 5, and this is the part where the light incident to the imaging part 5 is transmitted. Also, the middle section 21c is the part where the polarizing filter is provided. The polarization direction of the polarizing filter of the upper section 21b and the polarization direction of the polarizing filter of the middle section 21c are different by, for example, 90 degrees. In FIGS. 9 and 10, the part where the polarizing filter is provided is shown as a light-colored part. In FIGS. 2, 3, and 6, the part where the polarizing filter is provided is shown as an uncolored part, but in fact, it is light-colored in the same way as FIGS. 9 and 10.

That is, the light irradiated from the first light emitting diodes 16 reaches the workpieces W without passing through the polarizing filter, and on the other hand, the light irradiated from the second light emitting diodes 17 reaches the workpieces W through the polarizing filter. The light reflected from the workpieces W enters the imaging part 5 through the polarizing filter.

Accordingly, without removing the polarizing filter attachment 3 by the user, the optical information reading device 1 electrically switches either of the first light emitting diodes 16 and the second light emitting diodes 17 to be turned on. Specifically, regarding the workpieces W (for example, casting, etc.) in which no polarizing filter has more advantages, the first light emitting diodes 16 are turned on and the second light emitting diodes 17 are turned off. On the other hand, regarding the workpieces W (for example, in a case in which two-dimensional codes are attached to print substrates, milling machined surfaces, black resins, etc.), the first light emitting diodes 16 are turned off and the second light emitting diodes 17 are turned on.

[Structure of Imaging Part 5]

FIG. 11 is a block diagram showing the structure of the optical information reading device 1. As shown in FIG. 11, the imaging part 5 is provided with an imaging element 5a, which takes images of codes attached to the workpieces W and irradiated by the aforementioned illumination part 4, an optical system 5b having a lens, etc., and an Auto-Focus mechanism (AF mechanism) 5c. In the optical system 5b, there is a configuration to enter the light reflected from the part where codes are attached on the workpieces W. The imaging element 5a is an image sensor, which is made of a Charge-Coupled Device (CCD), a Complementary Metal Oxide Semiconductor (CMOS), etc., to convert electric signals from the images of the codes obtained through the optical system 5b. The imaging element 5a is connected to the control unit 29, and the electric signals converted by the imaging element 5a are inputted to the control unit 29. Further, the AF mechanism 5c is the mechanism in which a focusing is performed by changing the position or the index of refraction of the focusing lens within the lens constituting the optical system 5b. The AF mechanism 5c is also connected to the control unit 29 and is controlled by an AF control part 29a of the control unit 29.

[Structure of Display Part 6]

The display part 6 is made of, for example, an organic EL display, a liquid crystal display, etc. The display part 6 is connected to the control unit 29 and can display the codes of images taken by the imaging part 5, character strings which are the decoding results of the codes, success rate of reading, matching level, etc. The success rate of reading means the average of success rate of reading when the reading process is executed multiple times. The matching level means a reading margin which indicates easiness of reading codes which are successfully decoded. It can be calculated from the number of corrections of errors, etc. which occur at the time of decoding, and it may be expressed by, for example, values. The less error corrections there are, the higher the matching level (reading margin) becomes. On the other hand, the more error corrections there are, the lower the matching level (reading margin) becomes.

[Structure of Conversion Part 30]

The optical information reading device 1 is provided with a conversion part 30. The conversion part 30 is connected to the control unit 29. The conversion part 30 is the part producing a second image by converting from a pixel value of a first image obtained by the imaging element 5 to a pixel value in response to a predetermined conversion characteristic. The first image may be called as an image before conversion. The second image may be called as an image after conversion. The conversion characteristics used when the conversion part 30 converts the pixel value of the first image are preliminary stored in a conversion characteristic storage part 35d of a storage device 35 which will be described later.

[Structure of Decoding Part 31]

The optical information reading device 1 has a decoding part 31 which decodes black and white binarized data. For decoding, a table which indicates a comparison of relationships of coded data can be used. Further, the decoding part 31 checks whether or not the decoding data is proper in accordance with a predetermined check system. When an error is found in the data, proper data is computed by using an error correction function. The error correction function differs depending on the types of code.

In this embodiment, the decoding part 31 decodes the code, which is included in the second image converted by the conversion part 30. The decoding part 31 is configured to write the decoding results, which are obtained by decoding the codes, in the storage device 35. Further, in the decoding part 31, an image processing such as various types of image processing filters, etc. is performed to the second image before decoding.

[Structure of Communication Part 32]

The optical information reading device 1 has a communication part 32. The communication part 32 is the part where the communication is performed with the computer 100 and the PLC 101. The communication part 32 may be provided with an I/O part connected with the computer 100 and the PLC 101, a serial communication part such as RS232C, etc., and a network communication part such as a wireless LAN, a wired LAN, etc.

[Structure of Control Unit 29]

The control unit 29 show in FIG. 11 is the unit for controlling each part of the optical information reading device 1, and may be provided with a CPU or MPU, a system SI, a DSP or an exclusive hardware, etc. The control unit 29 provides various functions which will be described later, and these functions may be performed by a logical circuit, or may be performed by executing a software.

The control unit 29 is provided with an AF control part 29a, an imaging control part 29b, a tuning part 29c, a processing part 29d, and an UI managing part 29e. The AF control part 29a is the unit which controls the AF mechanism 5c, and focusing of the optical system 5b can be performed by a conventionally well-known contrast AF or phase difference AF.

The imaging control part 29b is the unit which adjusts a gain, controls light amount of the illumination part 4, and controls an exposure time (shutter speed) of the imaging element 5a. Here, the gain means an amplification factor (called as magnification) when amplifying brightness of an image outputted from the imaging element 5a by a digital image processing. Regarding the light amount of the illumination part 4, it can be changed by separately controlling the first light emitting diodes 16 and the second light emitting diodes 17. The gain, the light amount of the illumination part 4, and the exposure time are the imaging condition of the imaging part 5.

The tuning part 29c is the unit that changes the imaging condition such as the gain, the light amount of the illumination part 4, and the exposure time, etc., and an image processing condition in the decoding part 31. The image processing condition in the decoding part 31 means a switching of image processing filters, a combination of different types of image processing filters, etc. when there is coefficient of image processing filters (strength/weakness of filter) or a plurality of image processing filters. A proper imaging condition and a proper image processing condition differ depending on external light effect to the workpieces W at the time of conveyance, colors and materials, etc. of the surface where a code is attached. Therefore, the tuning part 29c searches more proper imaging condition and image processing condition, and sets the processes performed by the AF control part 29a, the imaging control part 29b, and the decoding part 31. For the image processing filters, various types of conventionally well-known filters can be used.

The processing part 29d is configured to control the conversion part 30 to generate the second images in response to each of the plurality of different conversion characteristics stored in the conversion characteristic storage part 35d by using the first images obtained by the imaging part 5 at the time of setting of the optical information reading device 1 which is performed before the operation of the optical information reading device 1. The processing part 29d is configured to select one option among the plurality of different conversion characteristics by analyzing each of the decoding results in which the codes included in the generated second images are decoded by the decoding part 31. The processing procedure by the processing part 29d will be described later in detail based on a flowchart, but the brief procedure is described as follows.

That is, before the operation of the optical information reading device 1, as the operation preparation stage, the setting of the optical information reading device 1 is performed. At the time of setting of the optical information reading device 1, various types of settings are performed by sending various commands for setting from the computer 100 connected to the optical information reading device 1 through the signal line 101a. At the time of setting, the tuning is performed by the aforementioned tuning part 29c. When the tuning is performed, the first image is obtained by taking an image of a code attached to the workpiece W by the imaging part 5. The second image is generated by converting the pixel value of the obtained first image to the pixel value in response to one of the conversion characteristics among the conversion characteristics stored in the conversion characteristic storage part 35d. Further, the second image is generated by converting the pixel value of the obtained first image to the pixel value in response to another conversion characteristic among the conversion characteristics stored in the conversion characteristic storage part 35d. If the number of the conversion characteristics stored in the conversion characteristic storage part 35d is more than three, more than three of the second images may be generated by the conversion part 30.

Each of the codes included in the plurality of generated second images is decoded, and in the processing part 29d, the reading margin indicating easiness of reading the codes which are successfully decoded is analyzed. The processing part 29d selects a conversion characteristic of the second image in which the reading margin is high based on the results of the reading margin analysis. After the setting of the optical information reading device 1 is finished, at the time of operation of the optical information reading device 1, by using the first image obtained by the imaging part 5, the second image in response to the conversion characteristic selected by the aforementioned processing part 29d is generated and is decoded by the decoding part 31.

The processing part 29d may be configured to control the imaging part 5 to obtain one first image at the time of setting of the optical information reading device 1, and to control the conversion part 30 to generate a plurality of second images in response to each of the plurality of different conversion characteristics stored in the conversion characteristic storage part 35d by using the one first image. In this case, at the time of setting of the optical information reading device 1, the second images, of which the number is same as the number of the conversion characteristics stored in the conversion characteristic storage part 35d, are generated.

Further, the processing part 29d may be configured to control the imaging part 5 to obtain a plurality of first images at the time of setting of the optical information reading device 1, and to control the conversion part 30 to generate a plurality of second images in response to each of the plurality of different conversion characteristics stored in the conversion characteristic storage part 35d for each of the plurality of first images. In this case, the plurality of first images are obtained at the time of setting of the optical information reading device 1, so that the second images, of which the number is same as the number multiplied by the number of the first images and the number of conversion characteristics stored in the conversion characteristics storage part 35d are generated.

Further, the processing part 29d may be configured to control the imaging part 5 to obtain a plurality of first images which are taken multiple times in different imaging conditions at the time of setting of the optical information reading device 1. The imaging conditions are the gain, the light amount of the illumination part 4, the exposure time, etc.

The UI managing part 29e shown in FIG. 11 is the unit which controls the display part 6 to display various interfaces, codes of images taken by the imaging part 5, character strings which are the decoding results of the codes, success rate of readings, matching level, etc., and which receives inputs from the select button 11 and the enter button 12, and which controls the indicator 9 to turn on.

[Structure of Storage Device 35]

The storage device 35 is constituted by a memory, a hard disk, etc. In the storage device 35, a decoding result storage part 35a, an image data storage part 35b, a parameter setting storage part 35c, and a conversion characteristic storage part 35d are provided. The decoding result storage part 35a is the part storing the decoding results which are the results of decoding by the decoding part 31. The image data storage part 35b is the part storing images taken by the imaging element 5a.

Figure 12:
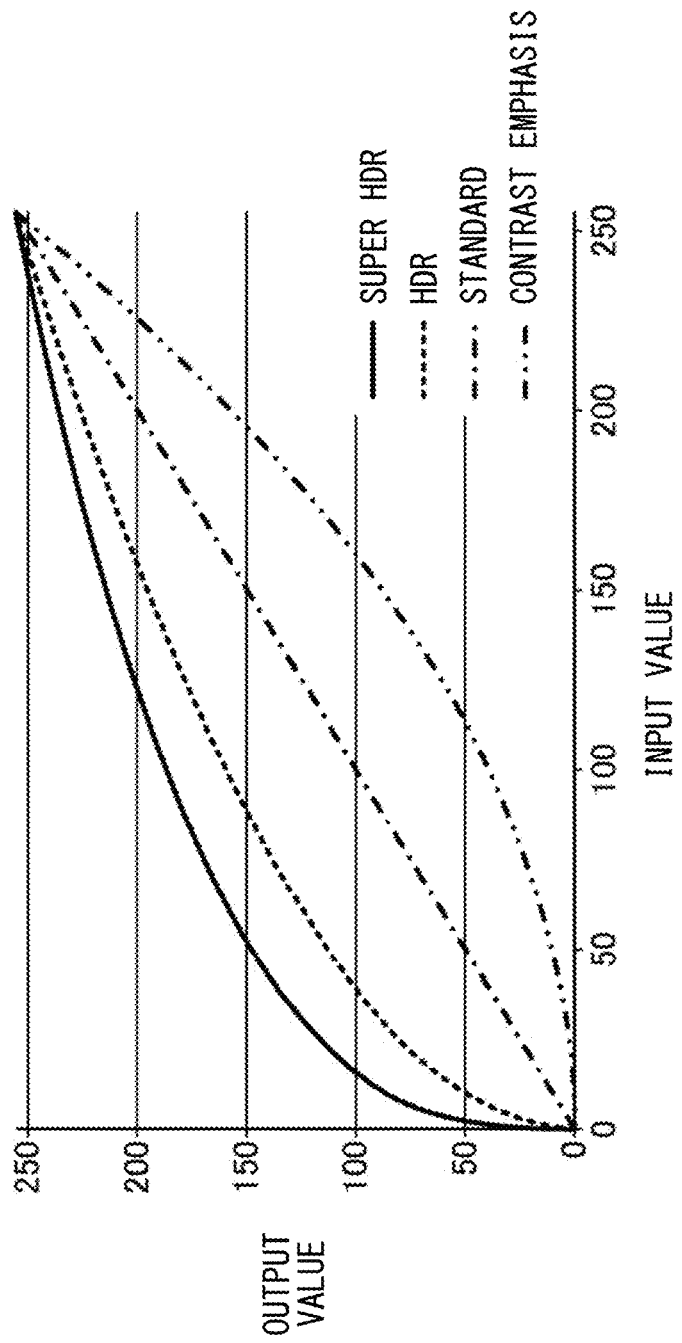
FIG. 12 is a graph showing four types of conversion characteristics.

The conversion characteristic storage part 35d is the part which stores a plurality of different conversion characteristics used at the time of converting the pixel value of the first image in the conversion part 39. The conversion characteristics are gradation conversion characteristics, and in this embodiment, as shown in FIG. 12, four conversion characteristics which change a gamma value of a gamma conversion are preliminarily stored in the conversion characteristic storage part 35d. As the conversion characteristics stored in the conversion characteristic storage part 35d, a HDR characteristic ($1^{st}$ conversion characteristic) in which the gamma value is greater value than 1.0 (e.g., 2.0), a super HDR ($1^{st}$ conversion characteristic) in which the gamma value is greater than the gamma value of the HDR characteristic, a standard characteristic in which the gamma value is 1.0, and a contrast emphasis characteristic ($2^{nd}$ conversion characteristic) in which the gamma value is less than 1.0 (e.g., 0.5). The gamma value of each conversion characteristic is illustrative, so that it is not limited to the aforementioned values. Further, the number of the conversion characteristics stored in the conversion characteristic storage part 35d is not limited to four, and the number of the conversion characteristics does not matter as long as there are at least two or more. Further, as the $1^{st}$ conversion characteristic, only one of the HDR characteristic and the super HDR characteristic may be stored.

Since the gamma values of the HDR characteristic and the super HDR characteristic are greater than 1.0, so-called log conversion, it has a characteristic to be formed of a substantially logarithmic curve so as to suppress the brightness variation of the first image obtained by the imaging part 5 at the time of operation of the optical information reading device 1. Even when the brightness of codes on the workpieces W is changed, the brightness variation of the second images for decoding is suppressed. Further, by using the HDR characteristic and the super HDR characteristic, the halation hardly occurs, so that it hardly lacks the information. For example, in a case in which the effective view field of the image part 5 is wide or becomes long and deep, the variation in the distance between the workpieces W and the imaging part 5 becomes large, and therefore, it may be considered that the brightness of the first images obtained by the imaging part 5 at the time of operation of the optical information reading device 1 greatly varies. However, by selecting the HDR characteristic and the super HDR characteristic, the second images in which the brightness variation is suppressed can be obtained, and therefore, the reading accuracy is enhanced.

Since the gamma value of the standard characteristic is 1.0, the pixel value of the first images obtained by the imaging part 5 at the time of operation of the optical information reading device 1 is outputted as it is. The standard characteristic has a characteristic between the HDR characteristic and the contrast emphasis characteristic. The larger number of bits of the first image there are, the more the information can be compressed and obtained, so that when inputting the imaging element 5*a*, 12 bits input is richer in expression than 10 bits input. In this way, the brightness variation is suppressed and the reading accuracy is enhanced, so that it is preferred. Further, the signals inputted in 12 bits and 10 bits from the imaging element 5*a* are converted to 8 bits.

Figure 13:
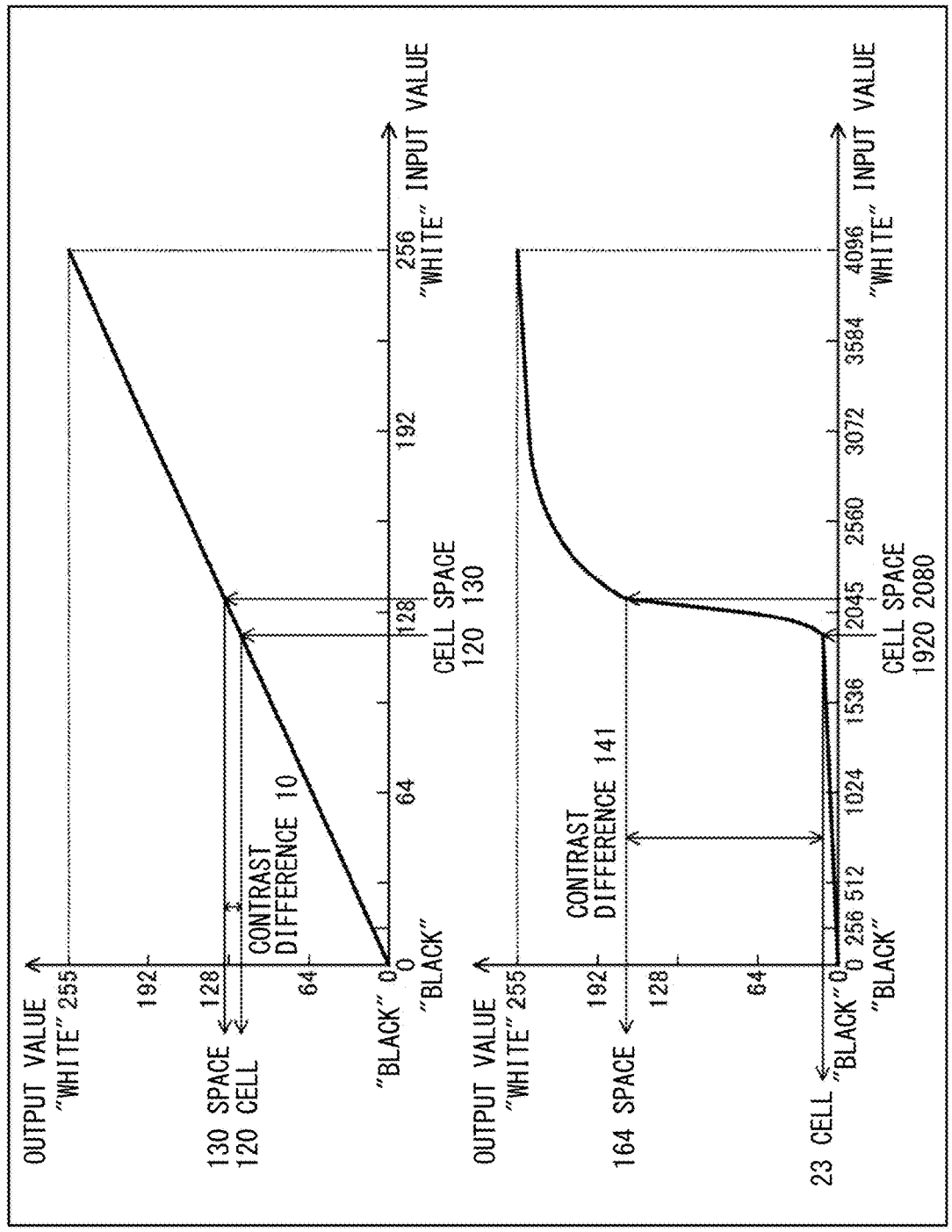
FIG. 13 is a graph showing an effect of contrast emphasis characteristics.

Since the gamma value of the contrast emphasis characteristic is less than 1.0, it has a characteristic to be formed of a substantially exponential curve which enhances the contrast of the first images obtained from the imaging part 5 at the time of operation of the optical information reading device 1. As shown in the upper side of FIG. 13, in a case in which the pixel value of the cell section (black part) of the two-dimensional code is 120 as a certain input value, and the contrast between the cell section and the space section is small such that the pixel value of the space section (white part) is 130, by converting in the contrast emphasis characteristic, as shown in the lower side of FIG. 13, the pixel value of the cell section (black part) becomes 23 as the output value and the pixel value of the space section (white part) becomes 164, and therefore, the contrast can be emphasized. The pixel values shown above are merely illustrative, so that it is not limited to these values.

As the conversion characteristics, four characteristics such as the HDR characteristic, the super HDR characteristic, the standard characteristic and the contrast emphasis characteristic are stored, and therefore, the processing part 29*d* controls the conversion part 30 to generate four types of the second images such as the second image in response to the HDR characteristic, the second image in response to the super HDR characteristic, the second image in response to the standard characteristic, and the second image in response to the contrast emphasis characteristic. The codes included in the four types of the second images are decoded by the decoding part 31 and the respective decoding results are analyzed, so that it can be configured to select one conversion characteristic. That is, the second images which are the same number as the number of the conversion characteristics can be generated.

The parameter setting storage part 35*c* shown in FIG. 11 is the part which stores setting information set by the setting device such as the computer 100, etc. or setting information set by the select button 11 and the enter button 12. In the parameter setting storage part 35*c*, a parameter setting including a plurality of parameters which constitute at least one of imaging conditions (gain, light amount of the illumination part 4, exposure time, etc.) of the imaging part 5 and an image processing condition (types of image processing filters, etc.) in the decoding part 31 can be stored. In this embodiment, the parameter settings, in which the parameters constituting the imaging conditions of the imaging part 5 and the parameters constituting the image processing conditions in the decoding part 31 are constituted as a set, are stored in multiple ways so as to display as banks 1 to 5 in the parameter setting display format 46 as shown in FIG. 14. The parameter settings include a parameter which constitutes the conversion characteristic selected by the processing part 29*d*. The parameter which constitutes the conversion characteristic is displayed in a "contrast adjustment method" column 46*a* of the user interface as shown in FIG. 14. Different parameter settings can be stored in banks 1 to 5, so that it can manage, for example, when the workpieces W are different. Any number of banks can be set.

In the optical information reading device 1, it is configured to switch from one parameter setting to another parameter setting among the plurality of parameter settings stored in the parameter setting storage part 35*e*. The switching of the parameter settings may be performed by the user, or it may be performed by a switching signal from the external control device such as PLC 101, etc. When the user performs the switching of the parameter settings, the user can operate the parameter setting switching part 46*b* which is incorporated in the user interface as shown in FIG. 14. By setting the parameter setting switching part 46*b* to be "valid", the parameter setting of the bank is used at the time of operation of the optical information reading device 1, and further, by setting the parameter setting switching part 46*b* to be "invalid", the parameter setting of the bank is not used at the time of operation of the optical information reading device 1. That is, the parameter setting switching part 46*b* is used to switch from one parameter setting to another parameter setting. The form of the parameter setting switching part 46*b* is not limited to the form shown in the drawing. For example, various forms such as a button, etc. may be used.

Here, regarding the parameter setting 46 shown in FIG. 14, a supplementary explanation is added. In FIG. 14, as the "common" parameter, an "alternate" (functions which performs imaging/decoding while automatically switching the plural registered parameter settings), a "number of times of retry in bank" (number of times of imaging/decoding until performing "alternate"), etc. are included. As the "code" parameter, a "code details setting" (code type for performing reading), a "column limit output function" (function which limits output column of reading data), etc. are included. As the "illumination" parameter, an "use of internal illumination" (use or non-use of illumination which is incorporated in the optical information reading device 1), an "use of external illumination" (use or non-use of illumination which is externally mounted to the optical information reading device 1), and a "polarizing filter" (whether or not activating a polarization mode, which will be described later) are included. As the "imaging" parameter, an "exposure time" (exposure time µs at the time of taking images), a "gain" (gain at the time of taking images) and a "contrast adjustment method" (any of the aforementioned "HDR", "super HDR", "standard characteristic" and "contrast emphasis characteristic") are included. Further, as the "image processing filter" parameter, a "first image processing filter" (type of the first executing image filter), a "number of times of the first image processing filter" (number of times of executing the first image filter), etc. are included.

In FIG. 14, in banks 1 to 5, the aforementioned "contrast adjustment method" is set in "HDR", "contrast emphasis", "standard", "super HDR", "HDR", respectively. Further, for the aforementioned "alternate", only bank 1 and bank 2 become "valid". Accordingly, first, the optical information reading device 1 attempts decoding by using the contrast adjustment method "HDR" which is the setting content of bank 1. When the decoding fails, it switches from the setting content of bank 1 to the setting content of bank 2, and attempts decoding by using the contrast adjustment method "contrast emphasis" which is the setting content of bank 2. That is, by attempting the decoding while automatically switching the plural registered parameter settings, it can attempt decoding while automatically switching the contrast adjustment methods, and the reading accuracy can be enhanced.

As the order of the aforementioned "alternate", various methods can be considered. For example, as described above, the decoding may be attempted by switching the banks in order from 1$^{st}$ bank. Other than that, for example, the bank in which the reading has been successful may be prioritized. Specifically, regarding the bank in which the reading has been successful, it may be set preferentially for the next reading. Accordingly, for example, when the printing state changes in a lot unit, the reading tact can be shortened.

[Structure of Computer 100]

Figure 15:
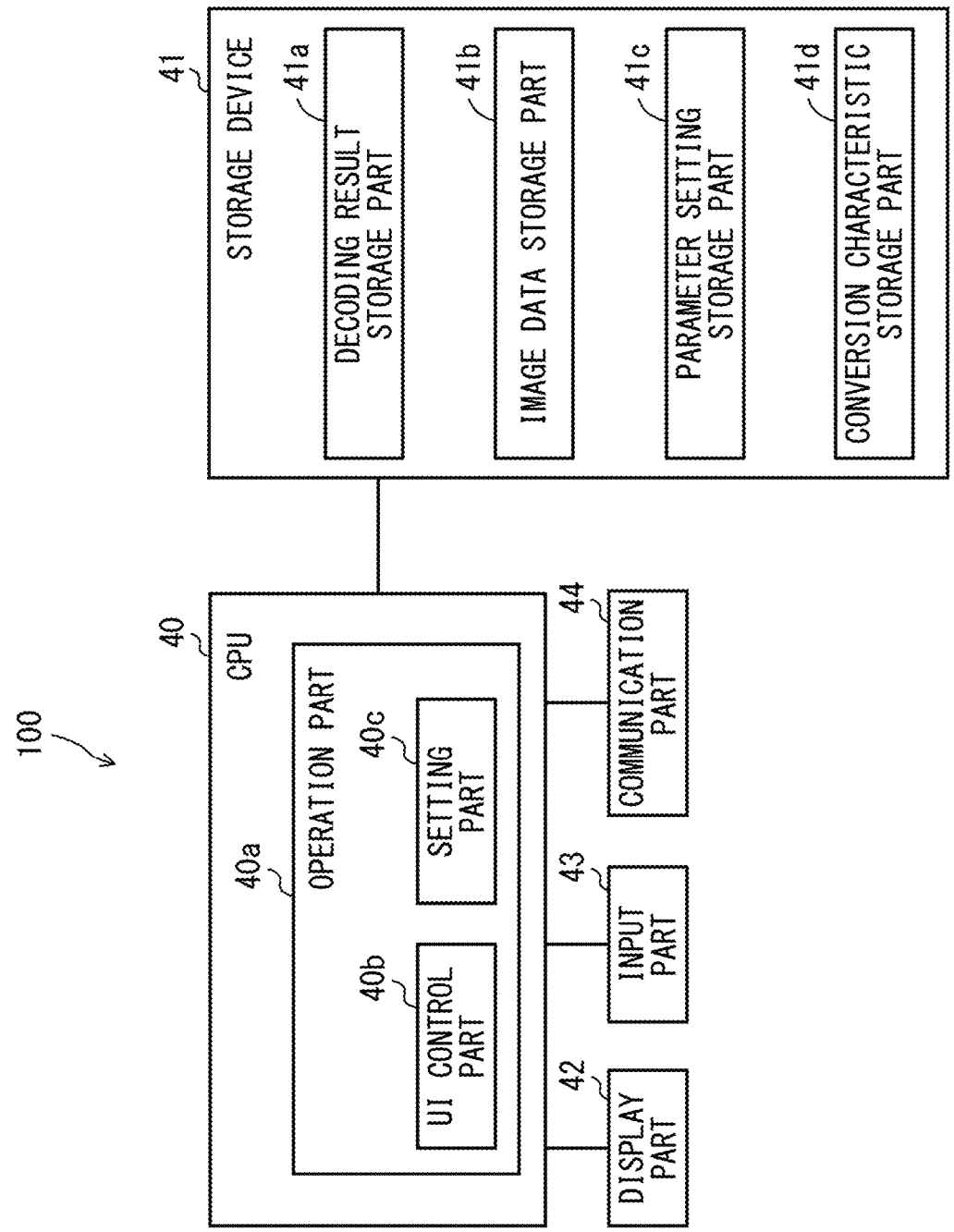
FIG. 15 is a block diagram showing a computer.

As shown in the block diagram of FIG. 15, the computer 100 is provided with a CPU 40, a storage device 41, a display part 42, an input part 43, and a communication part 44. By minimizing the optical information reading device 1, it hardly performs all settings of the optical information reading device 1 by using only the display part 6 of the optical information reading device 1, the buttons 11, 12, etc., so that the computer 100, which is separated from the optical information reading device 1, is prepared, and various settings of the optical information reading device 1 are performed in the computer 100 and the setting information may be transferred to the optical information reading device 1.

Further, the computer 100 and the optical information reading device 1 are connected in a bilaterally communicable state, and a part of the processing of the aforementioned optical information reading device 1 may be performed in the computer 100. In this case, a part of the computer 100 becomes a part of the component elements of the optical information reading device 1.

The CPU 40 is the unit which controls each part of the computer 100 based on the programs stored in the storage device 41. The storage device 41 is provided with a memory, a hard disk, etc. The display part 42 is provided with, for example, a liquid crystal display, etc. The input part 43 is provided with a keyboard, a mouse, a touch sensor, etc. The communication part 44 is the part which performs a communication with the optical information reading device 1. The communication part 44 may has a serial communication part such as an I/O part, a RS232C, etc. which connects with the optical information reading device 1, and a network communication part such as a wireless LAN, a wired LAN, etc.

The CPU 40 is provided with an operation part 40a which performs various operations. In the operation part 40a, an UI control part 40b and a setting part 40c are provided. The UI control part 40b generates a user interface for setting the imaging condition in the imaging part 5 of the optical information reading device 1, the image processing condition in the decoding part 31, etc., and a user interface for displaying decoding results, image data outputted from the optical information reading device 1, etc., and displays in the display part 42. The display part 42 may be configured with a part of the optical information reading device 1. The setting part 40c sets the imaging condition of the imaging part 5 and the imaging processing condition in the decoding part 31. The UI control part 40b and the setting part 40c may be provided in the optical information reading device 1. Further, the UI control part 40b or the setting part 40c may entirely or partially carry the function (setting banks, etc.) of the processing part 29d.

The storage device 41 is provided with the decoding result storage part 41a, the image data storage part 41b, the parameter setting storage part 41c, and the conversion characteristic storage part 41d. These storage parts 41a to 41d are the parts that store the information similar to the decoding result storage part 35a, the image data storage part 35b, the parameter setting storage part 35c, and the conversion characteristic storage part 35d of the optical information reading device 1.

[Executing Steps at the Time of Setting]

Next, the executing steps at the time of setting of the optical information reading device 1 configured as described above will be described. The following steps may be executed by the control unit 29 of the optical information reading device 1, or may be executed by controlling each part of the optical information reading device 1 in the CPU 40 of the computer 100. In this embodiment, since the tuning part 29c is provided in the control unit 29 of the optical information reading device 1, the tuning step can be executed by the control unit 29.

Figure 17:
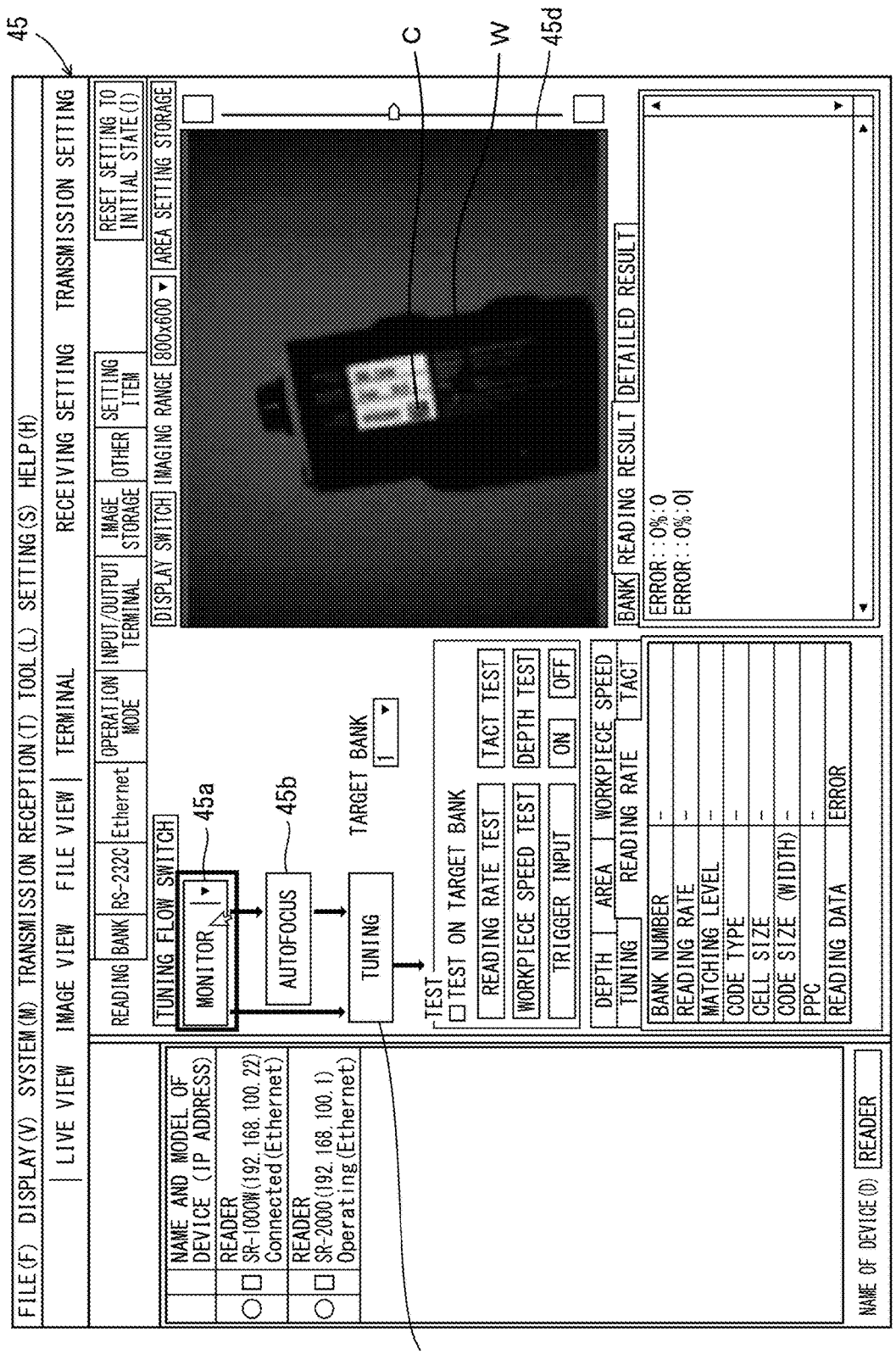
FIG. 17 is an interface for tuning at monitoring.

The tuning step at the time of setting of the optical info Illation reading device 1 is executed, and after the tuning step was completed, it shifts to the operation of the optical information reading device 1. In the tuning step, the UI control part 40b of the computer 100 displays the user interface 45 as shown in FIG. 17 in the display part 42 of the computer 100. The user interface 45 shown in FIG. 17 is the interface for tuning. In the interface for tuning 45, a monitor button 45a, an autofocusing button 45b, a tuning button 45c, and an image display are 45d are incorporated.

When the user clicks the monitor button 45a by controlling the input part 43 of the computer 100, the image which is currently taken by the imaging part 5 of the optical information reading device 1 is displayed in the image display area 45d, and the image displayed in the image display area 45d is updated in almost real time. The workpieces W are moved such that a code C of the workpiece W is displayed in the image display area 45d while watching the image in the interface for tuning 45 by the user.

Figure 18:
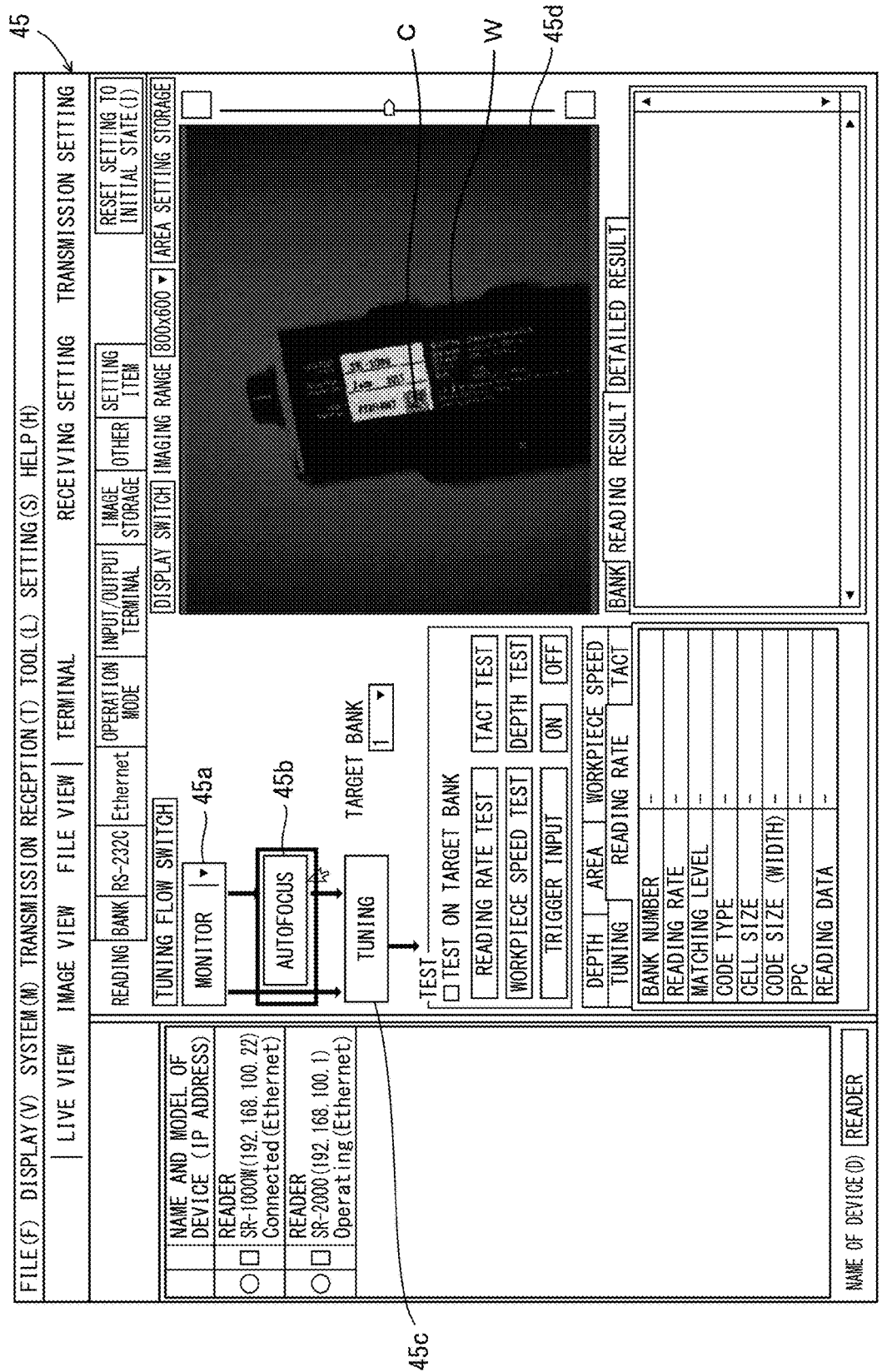
FIG. 18 is an interface for tuning in a state in which focusing is completed.

After that, when the user clicks the autofocusing button 45b in the interface for tuning 45, the code C is focused as shown in FIG. 18 by the AF mechanism 5c of the imaging part 5 which is controlled by the AF control part 29a. Accordingly, it can be confirmed that the code C is within the image display area 45d.

Figure 19:
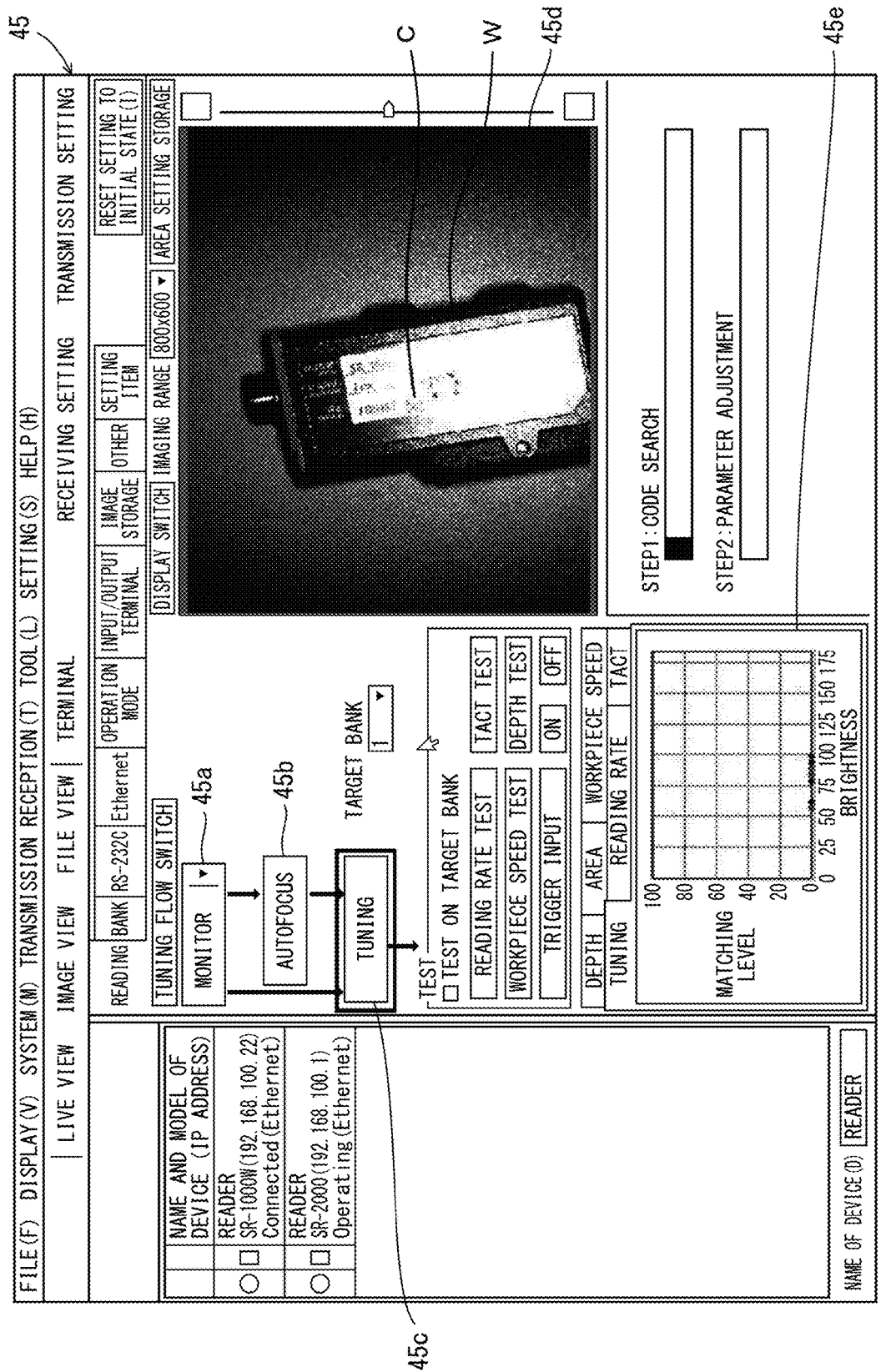
FIG. 19 is an interface for tuning during adjusting brightness.

When the user clicks the tuning button 45c in the interface for tuning 45, the tuning step is executed. The tuning step may be executed by controlling the select button 11 and the enter button 12 of the optical information reading device 1. In the tuning step, first, the tuning part 29c executes a code search (FIG. 19). For example, the tuning part 29c executes the imaging control part 29b to take images and obtains the image data, and executes the decoding part 31 to search a two-dimensional code based on the image data. The imaging control part 29b reads available reading conditions (an imaging condition for the imaging element 5a, an illumination condition of the illumination part 4, an image processing condition of the decoding part 31, etc.) at that point from the parameter setting storage part 35c and sets each part of the illumination part 4, the imaging element 5a, the decoding part 31, etc. The decoding part 31 searches a two-dimensional code from the image data obtained by the imaging element 5a and stored in the image data storage part 35b, and the search result is outputted to the tuning part 29c. The illumination condition includes information indicating whether the polarization mode is going to be valid (whether the parameter "polarizing filter" shown in FIG. 14 is valid), or the non-polarization mode is going to be valid (the parameter "polarizing filter" shown in FIG. 14 is going to be invalid). The polarization mode is the mode in which the first light emitting diodes 16 are turned off and the second light emitting diodes 17 are turned on, and the non-polarization mode is the mode in which the first light emitting diodes 16 are turned on and the second light emitting diodes 17 are turned off.

Figure 20:
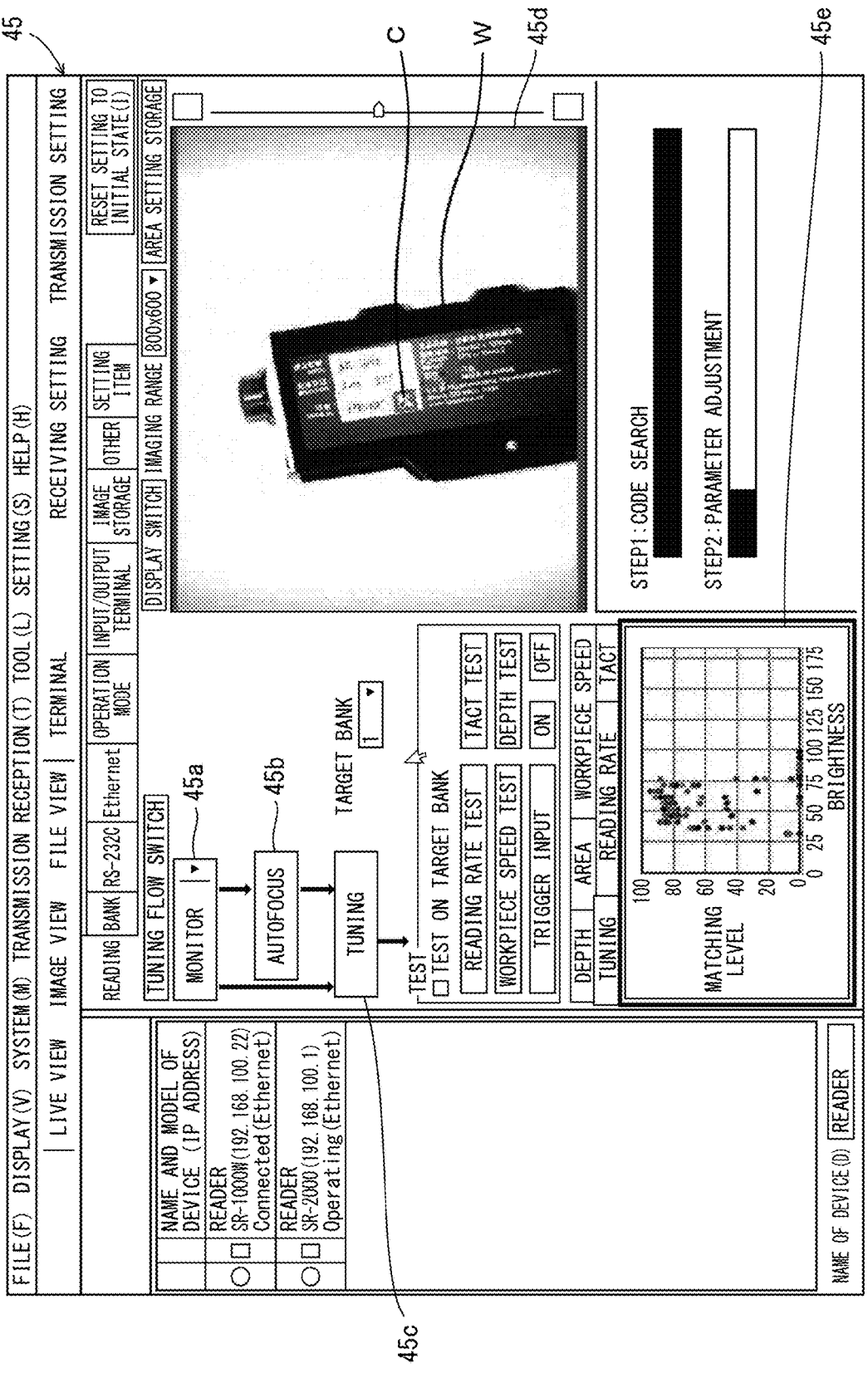
FIG. 20 is an interface for tuning when displaying a matching level.

The tuning part 29c executes a coarse adjustment for the brightness of the illumination part 4. In the present embodiment, the coarse adjustment for the brightness of the illumination part 4 is executed, and one of the polarization mode and the non-polarization mode is selected when the one is more preferable than the other in the reading result, and the fine adjustment of the brightness for the selected illumination mode is executed. When adjusting the brightness, the interface for tuning 45 is displayed as shown in FIG. 20.

After that, the tuning part 29c switches to the illumination mode which is different from the illumination mode set in the illumination part 4 at that point. That is, the tuning part 29c switches to the non-polarization mode when the polarization mode is set to the illumination part 4, and switches to the polarization mode when the non-polarization mode is set.

Thereafter, the tuning part 29c executes a reading test of the two-dimensional code. For example, the tuning part 29c controls the imaging control part 29b to execute taking images and obtaining the image data, and controls the decoding part 31 to execute searching a two-dimensional code. Here, among the reading conditions which are valid at that point, only the illumination mode is changed. The decoding part 31 searches a two-dimensional code for the image data obtained by the imaging element 5a and stored in the image data storage part 35b, and outputs the search result to the tuning part 29c.

Based on the search result of the decoding part 31, the tuning part 29c judges whether or not the reading test has been successful. When the reading test is executed multiple times while changing the reading conditions, it is judged whether or not the reading has been successful at least one time.

In a case in which the reading has been successful, when it is assumed that the brightness level is N (e.g., 256) in total for each illumination mode, the tuning part 29c executes the reading test to each of n (e.g., 27) brightness levels among the N brightness levels. In this way, the reading results for each of the 27 bright levels in the polarization mode are obtained, and the reading results for each of the 27 bright levels in the non-polarization mode are obtained. The brightness levels to be tuned in the polarization mode and the non-polarization mode may be different.

By passing through the polarizing filter, the brightness in the polarization mode becomes half of the brightness in the non-polarization mode. For the brightness level in the polarization mode, more than N/2 level among the N brightness levels may be assigned, and for the brightness levels in the non-polarization mode, less than N/2 level among the N brightness levels may be assigned. In this way, the time for reading test can be shortened in half in comparison with the case in which all of the N levels are comprehensively searched. Alternatively, when the time saving is not requested, all of the N levels in each illumination mode may be comprehensively searched.

The tuning part 29c determines the illumination mode which is the most preferable decoding result among the plurality of illumination modes. For example, when comparing the number of the successful reading tests in each of the illumination modes, the tuning part 29c determines the illumination mode in which larger number of reading tests has been successful. For example, when 27 reading tests are successful in the polarization mode and 10 reading tests are successful in the non-polarization mode, the polarization mode is selected. When the number of successful reading tests in the polarization mode and the number of successful reading tests in the non-polarization mode are the same or when a significant difference is not recognized in both modes, the tuning part 29c may select non-polarization mode. This is because when realizing the same brightness, the non-polarization mode has more advantages in the power consumption and the heating. In the environment in which ambient light, etc. easily generates, the polarization mode can cut a part of the ambient light by the polarizing filter, so that the success rate of reading is enhanced. Accordingly, in this case, the polarization mode may be preferentially employed. Here, the number of successful reading tests are compared, but the tuning part 29c may compare a success rate of reading, or it may calculate and compare a matching level, which indicates easiness of reading.

For example, the matching level may be displayed in a matching level display area 45e which is incorporated in the interface for tuning 45 as shown in FIG. 20. In the matching level display area 45e, the matching level is displayed in a graph form. The horizontal axis indicates brightness. The vertical axis indicates the matching level in a specific brightness. The matching level may be indicated in a value of, for example, 0 to 100. As the value becomes greater, the matching level becomes higher.

Further, the tuning part 29c determines the coarse adjustment result of the brightness. For example, it is assumed that the brightness level can be changed from 0 to 255. Among them, the reading test is executed to the n brightness levels. The tuning part 29c calculates the brightness which is the center of the m brightness levels (e.g., average value) in which the reading has been successful. In this way, the coarse adjustment of the brightness is executed.

If the reading test is never successful in the other illumination modes, the tuning part 29c omits or terminates the search processing of the reading condition in the other illumination mode, and the original illumination mode is selected. The tuning part 29c executes the reading test in each of the n (e.g., 27) brightness levels for the original illumination mode. In this way, the reading results for each of the 27 brightness levels in the polarization mode or the non-polarization mode which is the original illumination mode are obtained. After that, the tuning part 29c calculates the brightness level (e.g., average value) which is the center of the m brightness levels in which the reading has been successful.

When the brightness coarse adjustment is finished, the fine adjustment of the brightness is executed. The tuning part 29c changes the brightness around the brightness level determined by the coarse adjustment, and searches and determines the brightness level which is the most success rate of the reading or in which the matching level is the highest.

After that, the tuning part 29c executes the reading test again. The tuning part 29c judges whether or not the success rate of reading or the number of times of success exceeds a threshold. When the success rate of reading or the number of times of success exceeds the threshold, the tuning part 29c terminates the tuning processing. On the other hand, when the success rate of reading or the number of times of success does not exceed the threshold, the tuning part 29c judges whether or not the success rate of reading or the number of times of success exceeds the threshold by changing the reading condition (e.g., exposure time, gain, coefficient of image processing filter, etc.) other than the brightness.

The parameter constituting exposure time, gain, coefficient of image processing filter, etc., that is, the imaging conditions of the imaging part 5; and the parameter constituting the image processing conditions of the decoding part 31, etc. can be displayed in the user interface as show in FIG. 14 as, for example, bank 1, and the parameter setting is stored in the parameter setting storage part 35*e*.

Figure 16:
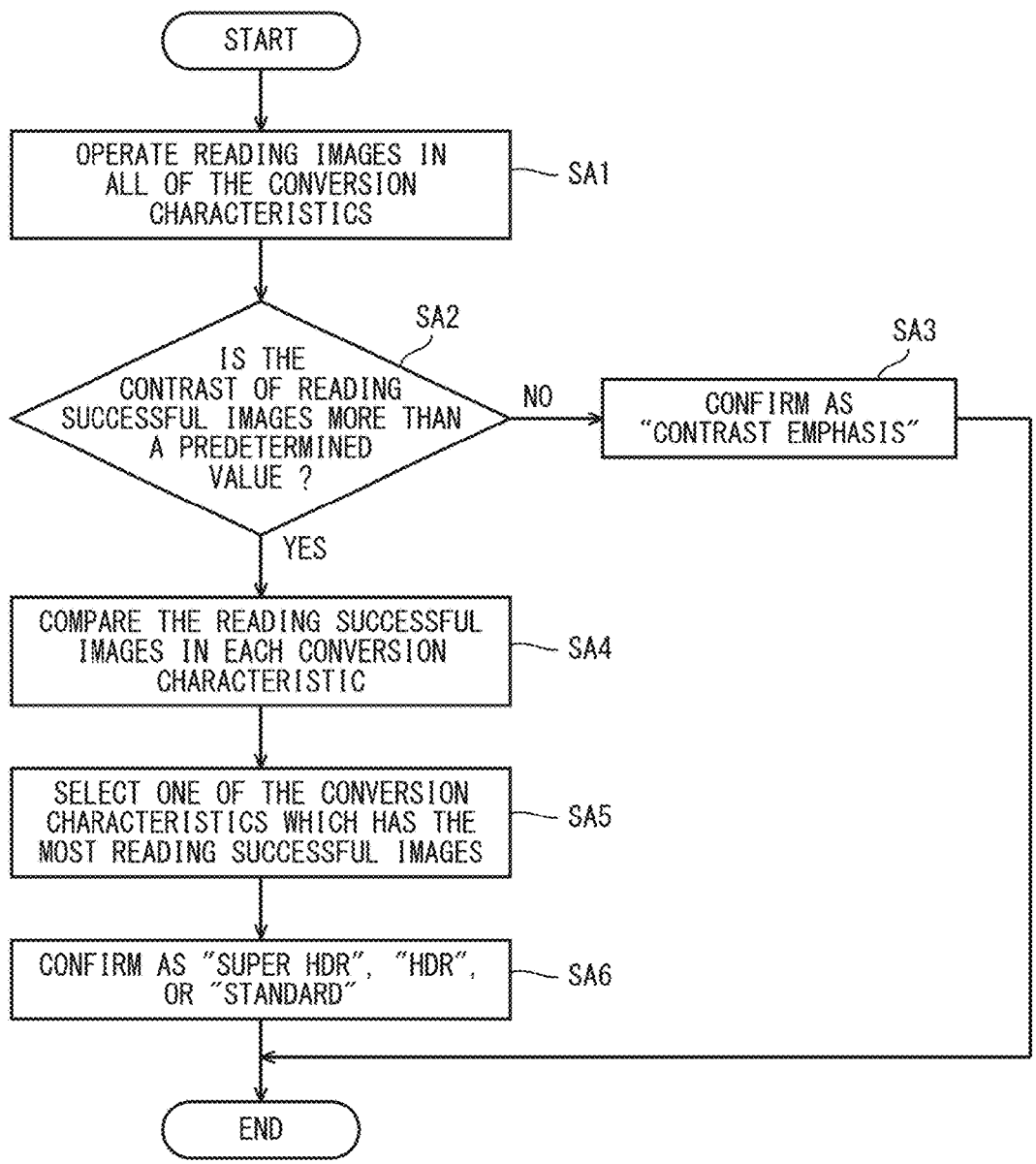
FIG. 16 is a flowchart showing control contents when operating all of conversion characteristics.

After the tuning step was finished, or during the tuning step, when the exposure time, the gain, the coefficient of image processing filter, etc. are determined, the processing part 29*d* performs the control as shown in FIG. 16. Hereinafter, the following example will be described. First, after the imaging conditions or the reading conditions such as exposure time, gain, image filter coefficient, etc. are determined (adjusted) in an optimum value, any one of the conversion characteristics is selected. However, the present invention is not limited to this example. Also, the conversion characteristics may be selected and determined (adjusted) in the optimum value with the exposure time, the gain, the image filter coefficient, etc. during the tuning step. In the latter example will be described later.

The control as shown in FIG. 16 is performed at the time of setting of the optical information reading device 1. That is, in Step SA1 after the start, the processing part 29*d* retrieves a plurality of image data obtained by the imaging part 5 and stored in the image data storage part 35*b*. The respective retrieved image data is the first images, and by using the first images, the conversion part 30 generates a plurality of second images in response to each of the plurality of different conversion characteristics stored in the conversion characteristic storage part 35*d*. In this embodiment, the second images, which are in response to the four conversion characteristics of the HDR characteristic, the super HDR characteristic, the standard characteristic and the contrast emphasis characteristic, are generated. Further, since the plurality of first images are retrieved, the second images, which are in response to the respective four conversion characteristics, are generated by using each of the first images. For example, when ten first images are retrieved, forty second images are generated. Further, in the case in which the plurality of first images is used, the plurality of first images which is taken by the imaging part 5 by changing the image conditions may be used, or the plurality of first images which is taken in the same imaging condition may be used. In addition, it may be configured to generate the plurality of second images which is in response to each of the plurality of different conversion characteristics by using one first image.

The two-dimensional codes included in the four generated second images are decoded respectively by the decoding part 31, and the results are analyzed. When the analysis is performed, the success or failure information, which is whether or not the reading of the two-dimensional codes is successful, or the matching level indicating easiness of reading the codes, which are successfully decoded, can be used. In the case of using the success or failure information, the success rate of reading can be calculated by counting the number of reading successful images among, for example, 10 images. In the case of using the matching level, when the matching level is more than the predetermined value (for example, more than 70 out of 100, which is set as the maximum value), it can be determined that the reading is successful.

In Step SA2, based on the result of the analysis in Step SA1, whether or not the contrast of the second images in which the reading has been successful is more than the predetermined value is judged. When the contrast of the second images, in which the reading has been successful in Step SA2, is less than the predetermined value, and when the second images are small contrast images, it is judged as NO in Step SA2 and proceeds to Step SA3. Proceeding to Step SA3 means that the contrast of the second images is less than the predetermined value and the contrast enhancement is required, so that the contrast emphasis characteristic is selected as the conversion characteristic in Step SA3.

On the other hand, when it is judged as YES in Step SA2 and when the contrast of the second images is more than the predetermined value, it proceeds to Step SA4, and the number of reading successful images is compared in each of the conversion characteristics. Next, in Step SA5, it is judged which conversion characteristic is the conversion characteristic in which there is the most number of the reading successful images, and it is selected. After that, it proceeds to Step SA6, and when the conversion characteristic in which there is the most number of reading successful images is the HDR characteristic, the HDR characteristic is selected as the conversion characteristic. Further, when the conversion characteristic in which there is the most number of reading successful images is the super HDR characteristic, the super HDR characteristic is selected as the conversion characteristic. Further, when the conversion characteristic in which there is the most number of reading successful images is the standard characteristic, the standard characteristic is selected as the conversion characteristic.

As described above, it was explained as followings. After the imaging conditions or the reading conditions such as the exposure time, the gain, the image filter coefficient, etc. are determined (adjusted) in the optimum value, the processing operation as shown in FIG. 16 selects any one of the conversion characteristics. In this example, since the conversion characteristic is selected, it is not necessary to take images again. Therefore, the optimum conversion characteristic can be selected in a short period of time. Such method has the advantage in a case that a two-dimensional code attached to, for example, a paper corrugated cardboard is read, etc., that is, in a case that a two-dimensional code attached to a workpiece, in which the brightness variation is relatively small, is read.

On the other hand, for example, in a case that a two-dimensional code attached to an electronic substrate including an electronic component, in which a mirror reflection easily occurs, is read, etc. there is a case in which the light amount taken by the imaging element largely varies depending on an ambient illumination environment. In this case, when the exposure time, gain, image filter coefficient, etc. are adjusted in the optimum value, it is also preferable to adjust (select) the optimum conversion characteristic. In other words, for each of the plurality of first images obtained while changing the imaging condition (illumination condition), the plurality of second images in response to the plurality of conversion characteristics is generated, and after evaluating the reading results (matching level, etc.) of the plurality of second images, it is preferable to select the conversion characteristic which is the excellent evaluation result. In this way, even when the two-dimensional code is attached to the workpiece, in which the brightness variation is relatively large, (electronic substrate, etc. as described above), the reading stability for the brightness variation can be enhanced. Hereinafter, it will be described in detail with reference to FIG. 22.

Figure 22:
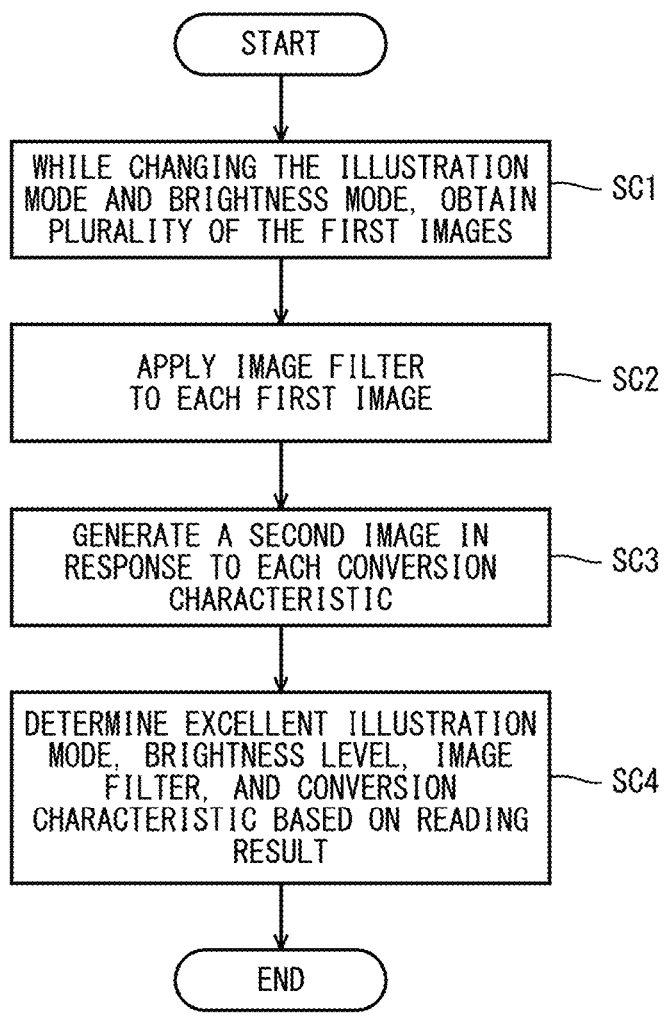
FIG. 22 is a flowchart showing control contents in a case in which a conversion characteristic is selected when an imaging condition or a reading condition is adjusted.

FIG. 22 is a flowchart showing control contents in a case in which a conversion characteristic is selected when an imaging condition or a reading condition is adjusted. Here, for convenience of explanation, it is assumed that there are the following adjustment candidates: as the adjustment candidate of illumination modes, 2 types of a polarization mode and a non-polarization mode (see the details described above); as the adjustment candidate of brightness levels, 10 types of exposure times (exposure time may be substituted to lighting intensity of LED); as the adjustment condition of imaging films, 3 types of filter coefficients (image filter type may be changed); and as the adjustment candidate of conversion characteristics, 4 types of "HDR", "super HDR", "standard", "contrast emphasis" as described above. Further, when the control shown in FIG. 22 is performed, the interfaces for tuning shown in FIGS. 19 and 20 are displayed.

In FIG. 22, first, in Step SC1, the first images are obtained while changing the illumination mode and the brightness level. Specifically, the tuning part 29c (and the imaging control part 29b) obtains 20 first images in total while changing the respective 10 types of brightness levels in each of 2 types of polarization mode and non-polarization mode.

Next, in Step SC2, for the 20 first images obtained in Step SC1, the tuning part 29c generates images, in which 3 types of filter coefficients are applied, that is, 60 first images in total. In the present embodiment, as the first images, the images after executing the filter processing by using the image filter are included.

Next, in Step SC3, for the 60 first images generated in Step SC2, the tuning part 29c (or the processing part 29d) generates second images in response to the respective 4 types of conversion characteristics by executing the conversion processing by using the 4 types of conversion characteristics. In this way, 240 images are generated.

Finally, in Step SC4, the tuning part 29c (or processing part 29d) evaluates the reading results (number of times of decoding success or matching level, etc.) of the 240 second images obtained in Step SC3, and determines the illumination mode, brightness level, image filter, and conversion characteristic which are the excellent evaluation result. Step SC4 will be described in more detail. For example, the illumination mode, brightness level, image filter, conversion characteristic when obtaining the second image, which has the largest matching level among the 240 matching levels for the 240 second images, may be determined.

Other various methods may be considered as the evaluation method in Step SC4. For example, first, the number of times of decoding success in the polarization mode and the number of times of decoding success in the non-polarization mode are compared based on the success/failure decoding of the 240 second images, and the illumination mode in which the number of times of decoding success is larger than the other mode is determined. Next, based on the success/failure decoding of the 120 (=240/2) second images obtained in the determined illumination mode, the numbers of times of decoding success are compared in the respective 4 types of conversion characteristics, and the conversion characteristic in which the number of times of decoding success is the largest is determined. Finally, the brightness level and the image filter when obtaining the second image, which has the largest matching level among the 30 matching levels for the 30 (=120/4) second images converted in the determined conversion characteristic, are determined. In this way, the illumination mode, brightness level, image filter, and conversion characteristic, which are the excellent evaluation result, may be determined by combining the number of times of decoding success and the matching level.

As described above, according to the control flow shown in FIG. 22, when the exposure time, gain, image filter coefficient, etc. are adjusted in an optimum value, the optimum conversion characteristic can be also adjusted (selected), so that the reading stability for the brightness variation can be enhanced.

Various modified examples may be considered for the control flow shown in FIG. 22. For example, in Step SC1, the illumination mode is changed as the imaging condition (illumination condition), but it may be omitted, and the illumination mode may be fixed. Further, in Step SC2, the image filter coefficient is changed as the reading condition, but it may be omitted, and the image filter may be fixed or the image filter may be not applied. Further, in FIG. 22, the control flow is executed in the order from Step SC2 to Step SC3, but the order from Step SC2 to Step SC3 may be reversed. Further, in Step SC4, the brightness level which is the excellent reading result is determined, but the determined brightness level may be employed as the coarse adjustment result of brightness as described above, and after this, the fine adjustment of the brightness as described above may be performed. That is, while using the illumination mode, image filter, conversion characteristic determined in Step SC4, the brightness is changed around the brightness level determined in Step SC4. The brightness level in which the most success rate of reading becomes the highest or in which the matching level becomes the highest may be searched and determined.

In short, at the time of setting of the optical information reading device 1, by the imaging control part 29b, a plurality of images is taken while changing at least brightness level (exposure time or lighting intensity), and a plurality of first images is obtained. For each of the plurality of first images which was obtained, the plurality of second images in response to each of the plurality of conversion characteristics stored in the conversion characteristic storage part 35d is generated by the conversion part 30. Finally, by analyzing the decoding results (including the results in which the decoding was attempted) of the codes included in the plurality of generated second images by the decoding part 31, the processing part 29d can select the optimum conversion characteristic among the plurality of conversion characteristics at the same time of adjusting the imaging condition (illumination condition) or the reading condition. With such configuration, the reading stability for the brightness variation at the time of code reading can be enhanced.

Here, the imaging condition (illumination condition) or the reading condition, the conversion characteristic selected by the processing part 29d are registered (set) in a bank which is currently selected (validated)(when the bank is not selected by the user, bank 1 is selected by default setting). Next, the user selects bank 2, and various parameter settings including the selection of the conversion characteristic are performed by the same method described above. For the following banks 3, 4, 5, . . . , it is the same. In this way, the images are repeatedly taken by changing the imaging condition or the illumination condition in a state that one bank is selected based on the user operation. The plurality of first images is obtained, and the plurality of second images in response to the plurality of conversion characteristics is generated. After analyzing the decoding results for the plurality of second images, various parameters, which are the optimum imaging condition (illumination condition) or the reading condition, conversion characteristic, are determined, so that these various parameters are registered in the one bank. Accordingly, the parameters strong against the brightness variation at the time of code reading can be set.

Here, the user selects a bank one by one, and in each selected bank, the processing, in which the images are repeatedly taken, is performed while changing the imaging condition or the illumination condition. In this case, sometimes, it takes time until the bank setting is completed. Therefore, after one bank which became a reference for the user was selected, for other banks, the parameters may be automatically registered (set). Hereinafter, it will be described in detail.

Specifically, for example, after one bank which became a reference for the user was selected, by the same technique as described above, the optimum illumination mode, brightness level, image processing filter are determined, and the optimum conversion characteristic "HDR" is determined. At this point, when the conversion characteristic "HDR" is determined, the number of times of decoding success is reviewed as described above, but sometimes, the number of times of decoding success in, for example, the conversion characteristic "HDR" and the number of times of decoding success in, for example, the conversion characteristic "contrast emphasis" are approximately the same (here, the conversion characteristic "HDR" is slightly greater). In such case, the conversion characteristic "HDR" is not only set in the one bank which is the reference, but the "contrast emphasis" may be automatically set in bank 2 as an alternative conversion characteristic. Since "alternate" in bank 1 and bank 2 is set in "valid" state as described above, when the decoding by using the conversion characteristic "HDR" is failed, it can be automatically switched to the decoding by using the conversion characteristic "contrast emphasis".

In other examples, regardless the number of times of decoding success, banks 2 to 4, in which other conversion characteristics "super HDR", "standard", "contrast emphasis" are set, respectively, may be automatically set with reference to bank 1, in which the aforementioned conversion characteristic "HDR" is set, as a reference (the parameter such as an image filter may be the same or may be different).

In short, based on the results in which the codes included in the plurality of respective second images, which is generated in response to each conversion characteristic, are decoded by the decoding part 31, the processing part 29$d$ selects the plurality of conversion characteristics, and may automatically generate or set the parameter settings (banks 1 to 6), which include the parameters ("HDR" or "contrast emphasis", etc.) constituting each of the selected plurality of conversion characteristics. These parameter settings may be stored in the parameter setting storage part 35$c$ by the processing part 29$d$.

[Control when the Conversion Characteristics are Sequentially Attempted]

Figure 21:
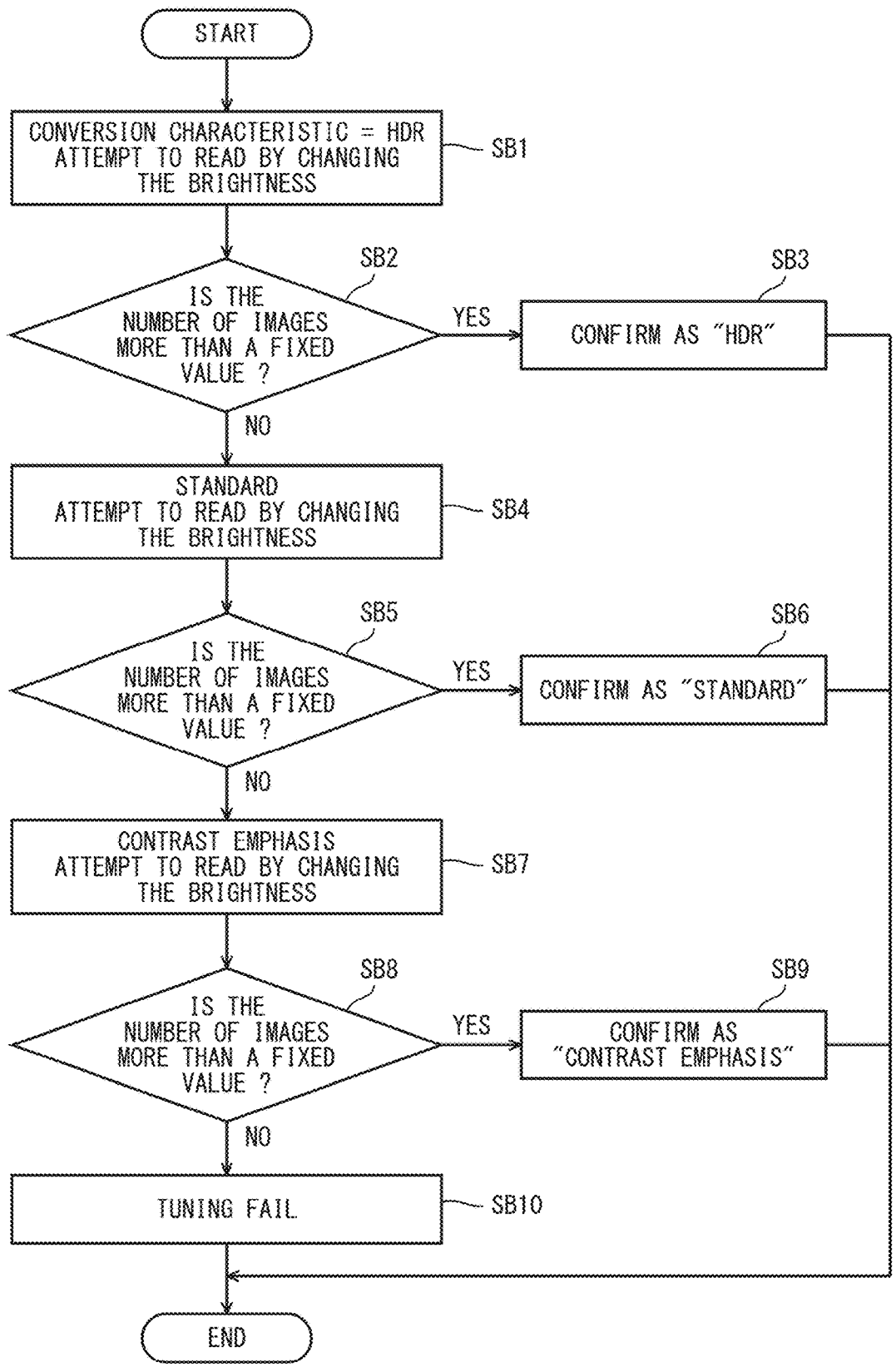
FIG. 21 is a flowchart showing control contents when sequentially attempting conversion characteristics.

In the aforementioned embodiment, the optimum conversion characteristic is selected after all the conversion characteristics stored in the conversion characteristic storage part 35$d$ were attempted, but it is not limited to this example. For example, as shown in the flowchart of FIG. 21, the conversion characteristics stored in the conversion characteristic storage part 35$d$ are sequentially attempted one by one, and finally, the optimum conversion characteristic may be selected. This processing may be executed during the tuning step.

That is, in Step SB1 of the flowchart of FIG. 21, the processing part 29$d$ retrieves image data obtained by the imaging part 5 and stored in the image data storage part 35$b$. The retrieved image data is the first images, and by using the first images, the second images in response to the HDR characteristic stored in the conversion characteristic storage part 35$d$ are generated by the conversion part 30. At this point, the plurality of second images is generated while changing the brightness of the illumination part 4 in multiple ways. The two-dimensional codes in all of the generated second images are respectively decoded by the decoding part 31. Further, the second images in response to the super HDR characteristic are generated in Step SB1.

In Step SB2, the results of Step SB1 are analyzed. That is, as the decoding results, the number of the second images in which the reading has been successful is obtained, and it is judged whether or not the number is more than a fixed value. The fixed value means the value in which the rate of reading error, which does not become any problem at the time of the actual operation, can be realized. In Step SB2, when the number of the second images, in which the reading has been successful, is more than the fixed value so as to be judged as YES, the HDR characteristic is selected as the conversion characteristic in Step SB3.

In Step SB2, when the number of the second images, in which the reading has been successful, is less than the fixed value so as to be judged as NO, it proceeds to Step SB4. By using the aforementioned first images, the second images in response to the standard characteristic stored in the conversion characteristic storage part 35$d$ are generated by the conversion part 30. At this point, the plurality of second images is generated while changing the brightness of the illumination part 4 in multiple ways. The two-dimensional codes in all of the generated second images are respectively decoded by the decoding part 31.

In Step SB5, the results of Step SB4 are analyzed. That is, as the decoding results, the number of second images in which the reading has been successful is obtained, and it is judged whether or not the number is more than the fixed value. In Step SB5, when the number of second images, in which the reading has been successful, is more than the fixed value so as to be judged as YES, the standard characteristic is selected as the conversion characteristic in Step SB6.

In Step SB5, when the number of second images, in which the reading has been successful, is less than the fixed value so as to be judged as NO, it proceeds to Step SB7, by using the aforementioned first images, the second images in response to the contrast emphasis characteristic stored in the conversion characteristic storage part 35$d$ are generated by the conversion part 30. At this point, the plurality of second images is generated while changing the brightness of the illumination part 4 in multiple ways. The two-dimensional codes in all of the generated second images are respectively decoded by the decoding part 31.

In Step SB8, the results of Step SB7 are analyzed. That is, as the decoding results, the number of second images in which the reading has been successful is obtained, and it is judged whether or not this number is more than the fixed value. In Step SB8, when the number of second images, in which the reading has been successful, is more than the fixed value so as to be judged as YES, in Step SB9, the contrast emphasis characteristic is selected as the conversion characteristic. The fixed value can be set more than half or more than 70%, etc. of the number of decoded images.

In Step SB8, when the number of second images, in which the reading has been successful, is less than the fixed value so as to be judged as NO, it proceeds to Step SB10. Since it has proceeded to Step SB10, as the results in which the respective conversion characteristics have been attempted, the number, in which the reading has been successful in the respective characteristics, has not reached the fixed value. In this case, it is determined that the tuning is failed, so that the tuning is terminated.

[Steps Executed at the Time of Operation]

The parameter constituting the conversion characteristic, which has been selected as described above, may be included in the parameter settings, and it may be associated with other parameters and stored in the parameter setting storage part 35c. In FIG. 14, the parameter constituting the conversion characteristic is displayed in the "contrast adjustment method" column 46a. With such configuration, the user can confirm the selected conversion characteristic. The conversion characteristic may be selected by manual operation by the user.

As described above, when the setting of the optical information reading device 1 is completed, and when the preparation for the operation of the optional information reading device 1 is finished, the optical information reading device 1 can be operated. At the time of operation of the optical information reading device 1, by using the first images obtained by the imaging part 5 at the time of operation of the optical information reading device 1, the conversion part 30 generates the second images in response to the conversion characteristic selected by the processing part 29d. The decoding part 31 decodes the codes of the second images and it is outputted. The outputted decoding results are stored in the decoding storage part 35a and are outputted to the computer 100. Further, as described above, the optical information reading part 1 may be separately operated from the computer 100.

[Existence/Nonexistence Detecting Method of Polarizing Filter Attachment]

As the method for automatically detecting whether or not a detachable member such as the polarizing filter attachment 3 is attached to the body, generally, it is well-known that for example, mechanical switches or electronic contacts are used, but in this case, there is a disadvantage due to the complicated structure.

In this embodiment, without using the mechanical switches or the electronic contacts, it is configured in which the existence/nonexistence of the polarizing filter attachment 3 can be automatically detected. Specifically, the light amount of the irradiated light is reduced by half by passing through the polarizing filter, and further, by using the characteristic in which the light amount of the light is reduced by half by passing through the polarizing filter when the light is received, the existence/nonexistence of the polarizing filter attachment 3 is automatically detected by a software as follows.

That is, first, an image is taken by the imaging part 5 in a state in which the first light emitting diodes 16 are turned on and the second light emitting diodes 17 are turned off After that, an image is taken by the imaging part 5 in a state in which the first emitting diodes 16 are turned off and the second light emitting diodes 17 are turned on. This order is not fixed, so that either one may be the first. After that, the brightness of the two images is compared, and if it is approximately the same, it is judged that the polarizing filter attachment 3 is not mounted. On the other hand, if the brightness of one of the images is approximately double (or approximately half) in comparison with the brightness of the other image, it is judged that the polarizing filter attachment 3 is mounted.

That is, it is provided with a comparison part which compares the brightness of the image, which is taken in the state in which the light emitting body arranged so as to pass through the polarizing filter of the polarizing filter attachment 3 is irradiated and the light emitting body arranged so as not to pass through the polarizing filter is not irradiated, and the brightness of the image, which is taken in the state in which the light emitting body arranged so as to pass through the polarizing filter of the polarizing filter attachment 3 is not irradiated and the light emitting body arranged so as not to pass through the polarizing filter is irradiated. The existence/nonexistence of the polarizing filter attachment 3 can be automatically detected based on the comparison result of the two images by the comparison part.

Effects of Embodiment

As described above, in the optical information reading device 1 according to the embodiment, at the time of setting of the optical information reading device 1, by using the first images obtained by the imaging part 5, the plurality of second images in response to each of the plurality of different conversion characteristics, which is preliminary stored in the conversion characteristic storage part 35d, can be generated. By analyzing the results in which the codes included in the plurality of generated second images are decoded, a conversion characteristic suitable for the operation time of the optical information reading device 1 can be selected. At the time of operation, by using the first images obtained by the imaging part 5, the second images in response to the conversion characteristic selected above are generated, and the codes included in the second images can be decoded.

That is, in a case that the brightness greatly varies, by selecting the conversion characteristic in which the brightness variation suppresses, the reading accuracy of the codes at the time of operation of the optical information reading device 1 can be enhanced. Further, in a case in which the codes attached to the workpieces are low contrast, by selecting the conversion characteristic which enhances the contrast, the reading accuracy of the codes at the time of operation of the optical information reading device 1 can be enhanced.

The aforementioned embodiments are in respects merely illustrative and are not to be construed in limiting fashion. All modifications and changes within the range of equivalents of the claims are, moreover, within the scope of the present invention.

INDUSTRIAL APPLICABILITY

As described above, the optical information reading device according to the present invention, can be used when codes such as a bar code or a two-dimensional code, etc. are read.

EXPLANATION OF SYMBOLS 1 optical information reading device
4 illumination part
5 imaging part
5a imaging element
29 control unit
29d processing part
30 conversion part
31 decoding part
35 storage device
35c parameter setting storage part
35d conversion characteristic storage part
46b parameter setting switching part
C code
W workpiece

What is claimed is:
1. An optical information reading device which includes an imaging part provided with an imaging element which takes an image of a code attached to a workpiece, a conversion part generating a second image by converting from a pixel value of a first image obtained by the imaging part to a pixel value in response to a predetermined conversion characteristic, and a decoding part decoding a code included in the second image generated by the conversion part, the optical information reading device comprising:

a conversion characteristic storage part storing a plurality of different conversion characteristics used as the predetermined conversion characteristic at a time of conversion of the pixel value in the conversion part;

a processing part controlling the conversion part to generate a plurality of second images in response to each of the plurality of different conversion characteristics stored in the conversion characteristic storage part by using the first image obtained by the imaging part at a time of setting of the optical information reading device before operation of the optical information reading device, and to select one of the plurality of different conversion characteristics by analyzing a result in which the code included in each of the plurality of generated second images is decoded by the decoding part; and a parameter setting storage part storing setting information including a parameter which constitutes the conversion characteristic selected by the processing part, wherein the conversion part generates a new second image in response to the conversion characteristic corresponding to the parameter stored in the parameter setting storage part by using a new first image obtained by the imaging part at a time of the operation of the optical information reading device, and the decoding part decodes a code included in the new second image generated by the conversion part.

2. The optical information reading device according to claim 1, wherein the processing part is configured to control the imaging part to obtain a plurality of first images at the time of setting of the optical information reading device, and controls the conversion part to generate a plurality of second images in response to each of the conversion characteristics, which are stored in the conversion characteristic storage part, for each of the plurality of first images.

3. The optical information reading device according to claim 2, further comprising: an illumination part illuminating the code attached to the workpiece;

the processing part is configured to control the imaging part to obtain the plurality of first images by taking images multiple times while changing an imaging condition or an illumination condition at the time of setting of the optical information reading device.

4. The optical information reading device according to claim 1, wherein the processing part is configured to control the imaging part to obtain one first image and to control the conversion part to generate a plurality of second images in response to each of the conversion characteristics, which are stored in the conversion characteristic storage part, by using the one first image at the time of setting of the optical information reading device.

5. The optical information reading device according to claim 1, wherein the conversion characteristic storage part includes at least a first conversion characteristic, which is formed of a substantially logarithmic curve for suppressing a brightness variation of the first images obtained by the imaging part at the time of operation of the optical information reading device, and a second conversion characteristic, which is formed on a substantially exponential curve for enhancing a contrast of the first images obtained by the imaging part at the time of operation of the optical information reading device, wherein the processing part is configured to control the conversion part to generate a second image in response to the first conversion characteristic and a second image in response to the second conversion characteristic, and by analyzing results in which codes included in the second images are decoded by the decoding part, one of the first conversion characteristic and the second conversion characteristic is selected.

6. The optical information reading device according to claim 1, wherein the processing part is configured to control the decoding part to decode each of the codes included in the plurality of second images, and to analyze a reading margin indicating easiness of reading the codes which are successfully decoded.

7. The optical information reading device according to claim 1, further comprising: a parameter setting storage part storing a parameter setting including a plurality of parameters which constitutes at least one of the imaging condition of the imaging part and the image processing condition in the decoding part;

wherein the parameter setting includes a parameter which constitutes a conversion characteristic selected by the processing part.

8. The optical information reading device according to claim 7, wherein the processing part selects a plurality of conversion characteristics based on the results in which a code included in each of the plurality of second images is decoded by the decoding part, and a parameter setting including a parameter, which constitutes each of the plurality of selected conversion characteristics, is stored in the parameter setting storage part.

9. The optical information reading device according to claim 7, wherein a plurality of different parameter settings is stored in the parameter setting storage part, the optical information reading device further comprising:

a parameter setting switching part switching from one parameter setting to another parameter setting.

* * * * *